United States Patent
Zhan et al.

(10) Patent No.: US 12,251,001 B2
(45) Date of Patent: Mar. 18, 2025

(54) STRAP ADJUSTING DEVICE AND WEARABLE DEVICE

(71) Applicant: GUANGDONG OPPO MOBILE TELECOMMUNICATIONS CORP., LTD., Guangdong (CN)

(72) Inventors: Wenxi Zhan, Guangdong (CN); Yihong Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 294 days.

(21) Appl. No.: 17/748,313

(22) Filed: May 19, 2022

(65) Prior Publication Data

US 2022/0276497 A1    Sep. 1, 2022

Related U.S. Application Data

(63) Continuation of application No. PCT/CN2020/130100, filed on Nov. 19, 2020.

(30) Foreign Application Priority Data

Dec. 6, 2019  (CN) .......................... 201911245199.3

(51) Int. Cl.
*A44C 5/18*        (2006.01)
*A44C 5/22*        (2006.01)
*G02B 27/01*       (2006.01)

(52) U.S. Cl.
CPC .................. *A44C 5/18* (2013.01); *A44C 5/22* (2013.01); *G02B 27/0176* (2013.01);
(Continued)

(58) Field of Classification Search
CPC ...... Y10T 24/21; Y10T 24/45461; A44C 5/18; A44C 5/22
See application file for complete search history.

(56) References Cited

U.S. PATENT DOCUMENTS 11,300,999 B1 *   4/2022   Kadirvel ............... G06F 1/1635
2013/0053661 A1   2/2013   Alberth et al.
(Continued)

FOREIGN PATENT DOCUMENTS

| CN | 105324650 | 2/2016 |
|----|-----------|--------|
| CN | 205691860 | 11/2016 |

(Continued)

OTHER PUBLICATIONS

Li, "Sensor Detection Technology and Instrumentation," China Railway Press, 2016.
(Continued)

*Primary Examiner* — Derek J Battisti
(74) *Attorney, Agent, or Firm* — Hodgson Russ LLP

(57) ABSTRACT

A strap adjusting device and a wearable device are provided. The strap adjusting device is configured for adjusting a length of a strap of the wearable device and includes a pressing piece including a supporting plate connected to the strap and a cushion arranged on the supporting plate; a first sensor arranged on the pressing piece and configured to detect a deformation parameter value of the cushion; and a tightness adjusting mechanism cooperating with the strap and configured to adjust the length of the strap in response to the deformation parameter value of the cushion.

17 Claims, 17 Drawing Sheets

(52) U.S. Cl.
CPC ....... *G02B 2027/0178* (2013.01); *Y10T 24/21* (2015.01); *Y10T 24/45461* (2015.01)

(56) References Cited

U.S. PATENT DOCUMENTS

| | | | | |
|---|---|---|---|---|
| 2015/0112153 | A1* | 4/2015 | Nahum | A61B 5/11 600/383 |
| 2015/0224275 | A1 | 8/2015 | Pastoor et al. | |
| 2017/0276943 | A1 | 9/2017 | Osman | |
| 2017/0337737 | A1* | 11/2017 | Edwards | F16M 13/04 |
| 2018/0199830 | A1 | 7/2018 | Basu et al. | |
| 2021/0080996 | A1* | 3/2021 | Hudman | A42B 3/042 |
| 2023/0152594 | A1* | 5/2023 | Davidson | G06F 1/203 359/601 |

FOREIGN PATENT DOCUMENTS

| | | |
|---|---|---|
| CN | 205720878 | 11/2016 |
| CN | 205958848 | 2/2017 |
| CN | 108205202 | 6/2018 |
| CN | 108302312 | 7/2018 |
| CN | 108369616 | 8/2018 |
| CN | 207689758 | 8/2018 |
| CN | 208013552 | 10/2018 |
| CN | 108801504 | 11/2018 |
| CN | 108803030 | 11/2018 |
| CN | 109283840 | 1/2019 |
| CN | 109407324 | 3/2019 |
| CN | 109752848 | 5/2019 |
| CN | 209014809 | 6/2019 |
| CN | 109953435 | 7/2019 |
| CN | 110376741 | 10/2019 |
| CN | 110441908 | 11/2019 |
| CN | 111025637 | 4/2020 |
| EP | 3564733 | 11/2019 |
| WO | 2015196255 | 12/2015 |

OTHER PUBLICATIONS

"Hall Type' Diagram of the Structure and function of the pressure sensor," Little Electrician, Electrician World, retrieved from the internet: <https://www.dgjsl23.com/sensor/5381.htm>, 2016.

WIPO, International Search Report and Written Opinion for PCT/CN2020/130100, Feb. 22, 2021.

CNIPA, First Office Action for CN Application No. 201911245199.3, Mar. 12, 2021.

CNIPA, Second Office Action for CN Application No. 201911245199.3, Oct. 20, 2021.

CNIPA, Rejection Decision for CN Application No. 201911245199.3, Mar. 4, 2022.

EPO, Extended European Search Report for EP Application No. 20896231.6, Nov. 28, 2022.

EPO, Communication for EP Application No. 20896231.6, Jul. 26, 2024.

* cited by examiner

STRAP ADJUSTING DEVICE AND WEARABLE DEVICE

CROSS REFERENCE TO RELATED APPLICATIONS

The present application is a continuation of International Patent Application No. PCT/CN2020/130100, filed Nov. 19, 2020, which claims priority to Chinese Patent Application No. 201911245199.3, filed Dec. 6, 2019, the entire disclosures of which are incorporated herein by reference.

TECHNICAL FIELD

The present disclosure relates to a technical field of intelligent devices, and in particular to a strap adjusting device and a wearable device.

BACKGROUND

Wearable devices (such as a headset, a smart watch, a smart bracelet, etc.) are becoming more and more popular. Common wearable devices are fixed on a head or a hand of a user through a strap cooperating with a strap buckle, and a fabric of the strap buckle is tightened by a magic hook to increase a tightening force, to realize a fixing function. As a result, the strap requires to be adjusted manually each time the wearable devices are worn, which is complicated to operate, and user experience may be influenced.

SUMMARY OF THE DISCLOSURE

According to a first aspect of the present disclosure, a strap adjusting device is provided and configured for adjusting a length of a strap of a wearable device. The strap adjusting device includes a pressing piece, a first sensor, and a tightness adjusting mechanism. The pressing piece includes a supporting plate connected to the strap and a cushion arranged on the supporting plate. The first sensor is arranged on the pressing piece and configured to detect a deformation parameter value of the cushion. The tightness adjusting mechanism cooperates with the strap and configured to adjust the length of the strap in response to the deformation parameter value of the cushion.

According to a second aspect of the present disclosure, a wearable device is provided and includes a host housing, a tightness adjusting mechanism, a strap assembly, a force-bearing component, and a first sensor. The tightness adjusting mechanism is opposite to the host housing. The strap assembly is connected to the host housing and the tightness adjusting mechanism to obtain an annular frame and includes a first head strap connected to an end of the host housing and an end of the tightness adjusting mechanism and a second head strap connected an opposite end of the host housing and an opposite end of the tightness adjusting mechanism. The tightness adjusting mechanism is cooperatively connected to the first head strap and the second head strap to adjust an overlapping length between the first head strap and the second head strap. The force-bearing component includes a fixing plate arranged on the annular frame and a cushion arranged on the fixing plate. The first sensor is arranged on the force-bearing component and configured to detect the deformation parameter value of the cushion. The tightness adjusting mechanism is configured to adjust the overlapping length between the first head strap and the second head strap, in response to the deformation parameter value of the cushion.

According to a third aspect of the present disclosure, a strap adjusting device is provided and configured for adjusting a length of a strap of a wearable device. The strap adjusting device includes a housing, a cushion, a first sensor a tightness adjusting mechanism, and a processor. The housing is connected to the strap. The cushion is arranged on the housing. The first sensor is arranged on at least one of the housing or the cushion and configured to detect a deformation parameter value of the cushion. The tightness adjusting mechanism is cooperatively connected to the strap and configured to adjust the length of the strap. The processor is configured to control the tightness adjusting mechanism to adjust the length of the strap, in response to the deformation parameter value of the cushion detected by the first sensor.

BRIEF DESCRIPTION OF THE DRAWINGS

In order to more clearly describe the technical solutions in the embodiments of the present disclosure, the following will briefly introduce the drawings required in the description of the embodiments. Obviously, the drawings in the following description are only some embodiments of the present disclosure. For those skilled in the art, other drawings can be obtained based on these drawings without creative work.

DETAILED DESCRIPTION

Figure 1:
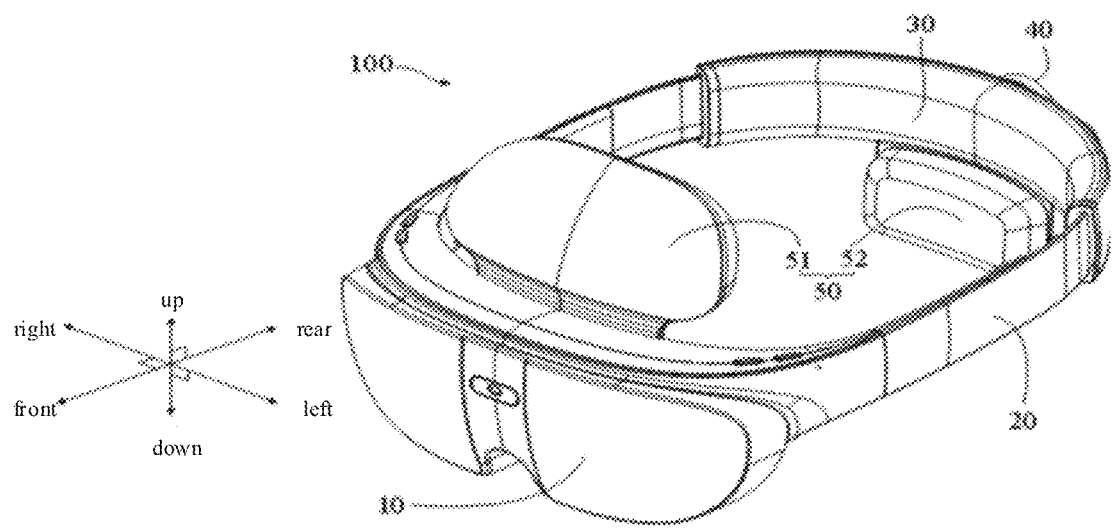
FIG. 1 is a perspective assembly view of a head-mounted device according to some embodiments of the present disclosure.

Technical solutions of the embodiments of the present disclosure will be clearly and completely described in the following by as shown in the accompanying drawings. Obviously, the embodiments described are only a part of the embodiments of the present disclosure, but not all of the embodiments. Based on the embodiments in the present disclosure, all other embodiments obtained by those of ordinary skill in the art without creative work shall fall within the protection scope of the present disclosure.

Reference herein to an "embodiment" means that a particular feature, structure, or characteristic described in combination with the embodiment may be included in at least one embodiment of the present disclosure. A presence of the term in various places in the specification is not necessarily all as shown in the same embodiment, nor is it a separate or alternative embodiment mutually exclusive with other embodiments. It is explicitly and implicitly understood by those skilled in the art that the embodiments described herein may be combined with other embodiments.

It should be pointed out that the terms "first", "second" and the like herein are only used for a description purpose, and cannot be construed as indicating or implying relative importance or implying the number of indicated technical features. Therefore, features defined by "first", "second" may expressly or implicitly include one or more of the features.

According to a first aspect of the present disclosure, a strap adjusting device is provided and configured for adjusting a length of a strap of a wearable device. The strap adjusting device includes a pressing piece, a first sensor, and a tightness adjusting mechanism. The pressing piece includes a supporting plate connected to the strap and a cushion arranged on the supporting plate. The first sensor is arranged on the pressing piece and configured to detect a deformation parameter value of the cushion. The tightness adjusting mechanism cooperates with the strap and configured to adjust the length of the strap in response to the deformation parameter value of the cushion.

In some embodiments, the tightness adjusting mechanism is configured to stop adjusting the length of the strap, in response to the first sensor detecting the deformation parameter value of the cushion reaching a preset threshold.

In some embodiments, the deformation parameter value of the cushion includes a thickness of the cushion.

In some embodiments, the first sensor includes a first sensing device arranged on one of the supporting plate and the cushion; and a first magnet arranged on the other of the supporting plate and the cushion. The first sensing device is configured to detect the thickness of the cushion by detecting a magnetic field generated by the first magnet.

In some embodiments, the first magnet is arranged on a surface of the cushion away from the supporting plate, and the first sensing device is arranged on a surface of the supporting plate close to the cushion.

In some embodiments, the strap has a first state in which the strap has the longest length and a second state in which the strap has the shortest length, the strap adjusting device further includes a second sensor connected to the tightness adjusting mechanism and configured to detect a length of the strap. The tightness adjusting mechanism is configured to stop adjusting the length of the strap in response to the length of the strap being in the first state or the second state.

In some embodiments, the tightness adjusting mechanism includes a housing. The housing is sleeved outside the strap, strap one end of the strap extends out the housing from one end of the housing, and the other end of the strap extends out the housing from the other end of the housing; The second sensor includes a second magnet, a second sensing device, and a third sensing device. The second magnet is fixed on the strap. The second sensing device is arranged on the housing and corresponds to the second magnet in response to the strap being in the first state. The third sensing device is arranged on the housing and corresponds to the second magnet in response to the strap being in the second state.

In some embodiments, in response to the strap being in the first state or the second state, the second magnet is located in the housing, and both the second sensing device and the third sensing device are arranged on an inner wall of the housing.

In some embodiments, the strap further includes a controlling switch connected to the tightness adjusting mechanism. The tightness adjusting mechanism is configured to perform an elongation adjusting process to increase the length of the strap in response to the controlling switch being in a first controlling state. The tightness adjusting mechanism is configured to perform a contraction adjusting process to decrease the length of the strap in response to the controlling switch being in a second controlling state.

According to a second aspect of the present disclosure, a wearable device is provided and includes a host housing, a tightness adjusting mechanism, a strap assembly, a force-bearing component, and a first sensor. The tightness adjusting mechanism is opposite to the host housing. The strap assembly is connected to the host housing and the tightness adjusting mechanism to obtain an annular frame and includes a first head strap connected to an end of the host housing and an end of the tightness adjusting mechanism and a second head strap connected an opposite end of the host housing and an opposite end of the tightness adjusting mechanism. The tightness adjusting mechanism is cooperatively connected to the first head strap and the second head strap to adjust an overlapping length between the first head strap and the second head strap. The force-bearing component includes a fixing plate arranged on the annular frame and a cushion arranged on the fixing plate. The first sensor is arranged on the force-bearing component and configured to detect the deformation parameter value of the cushion. The tightness adjusting mechanism is configured to adjust the overlapping length between the first head strap and the second head strap, in response to the deformation parameter value of the cushion.

In some embodiments, the tightness adjusting mechanism is configured to stop adjusting the overlapping length between the first head strap and the second head strap, in response to the first sensor detecting the deformation parameter value of the cushion reaching a preset threshold.

In some embodiments, a first end of the first head strap and a second end of the second head strap overlaps each other, a first length-adjusting hole is defined at the first end, a second length-adjusting hole is defined at the second end, a first sawtooth wave is arranged in the first length-adjusting hole, and a second sawtooth wave is arranged in the second length-adjusting hole. The tightness adjusting mechanism includes a housing for the tightness adjusting mechanism, a ratchet-pawl mechanism and a driving assembly. The housing for the tightness adjusting mechanism includes a continuous channel, and the first end and the second end are received in the continuous channel. The ratchet-pawl mechanism is accommodated in the housing for the tightness adjusting mechanism and includes a ratchet, a pawl assembly and a transmission gear. The pawl assembly engages with the ratchet and includes an engaging gear. The engaging gear is arranged in both the first length-adjusting hole and the second length-adjusting hole and is engaged with both the first sawtooth wave and the second sawtooth wave, the first sawtooth wave is located on one side of the engaging gear, and the second sawtooth wave is located on a side of the engaging gear opposite to the first sawtooth wave. The transmission gear is accommodated in the housing for the tightness adjusting mechanism and cooperates with the pawl assembly to drive the pawl assembly to rotate. The driving assembly is accommodated in the housing for the tightness adjusting mechanism and engaged with the transmission gear. In response to the deformation parameter value of the cushion, the driving assembly is configured to drive the pawl assembly to rotate by driving the transmission gear to rotate, and the engaging gear is driven to rotate, such that the first head strap and the second head strap are driven to move relative to each other.

In some embodiments, the pawl assembly further includes a mounting element, a rotating plate and a pawl. The engaging gear is arranged on one side of the mounting element. The rotating plate is arranged on the other side of the mounting element, being rotatable, and cooperates with the transmission gear. The pawl is pivotally connected to the mounting element, one end of the pawl abuts against a side surface of the rotating plate, and the other end of the pawl is engaged with the ratchet.

In some embodiments, the fixing plate is fixed on the housing for the tightness adjusting mechanism.

In some embodiments, the strap assembly has a first state in which the overlapping length between the first head strap and the second head strap is the shortest and a second state in which the overlapping length between the first head strap and the second head strap is the longest. The wearable device further includes a second sensor connected to the tightness adjusting mechanism and configured to detect a length of the strap assembly. The tightness adjusting mechanism is configured to stop adjusting the overlapping length between the first head strap and the second head strap in response to the length of the strap assembly being in the first state or the second state.

In some embodiments, the wearable device further includes a controlling switch connected to the tightness adjusting mechanism. The tightness adjusting mechanism is configured to perform an adjusting process to decrease the overlapping length between the first head strap and the second head strap in response to the controlling switch being in a first controlling state. The tightness adjusting mechanism is configured to perform an adjusting process to increase the overlapping length between the first head strap and the second head strap, in response to the controlling switch being in a second controlling state.

According to a third aspect of the present disclosure, a strap adjusting device is provided and configured for adjusting a length of a strap of a wearable device. The strap adjusting device includes a housing, a cushion, a first sensor a tightness adjusting mechanism, and a processor. The housing is connected to the strap. The cushion is arranged on the housing. The first sensor is arranged on at least one of the housing or the cushion and configured to detect a deformation parameter value of the cushion. The tightness adjusting mechanism is cooperatively connected to the strap and configured to adjust the length of the strap. The processor is configured to control the tightness adjusting mechanism to adjust the length of the strap, in response to the deformation parameter value of the cushion detected by the first sensor.

In some embodiments, the processor is configured to control the tightness adjusting mechanism to stop adjusting the length of the strap, in response to the deformation parameter value of the cushion reaching a preset threshold.

In some embodiments, the strap has a first state in which the strap has the longest length and a second state in which the strap has the shortest length. The strap adjusting device further includes a second sensor connected to the processor and configured to detect whether a length of the strap is in the first state or the second state. The processor is configured to control the tightness adjusting mechanism to stop adjusting the length of the strap in response to the length of the strap being in the first state or the second state.

In some embodiments, the strap adjusting device further includes a controlling switch connected to the processor. The processor is configured to control the tightness adjusting mechanism to perform an elongation adjusting process for the strap in response to the controlling switch being in a first controlling state. The processor is configured to control the tightness adjusting mechanism to perform a contraction adjusting process to decrease the length of the strap in response to the controlling switch being in a second controlling state.

Figure 17:
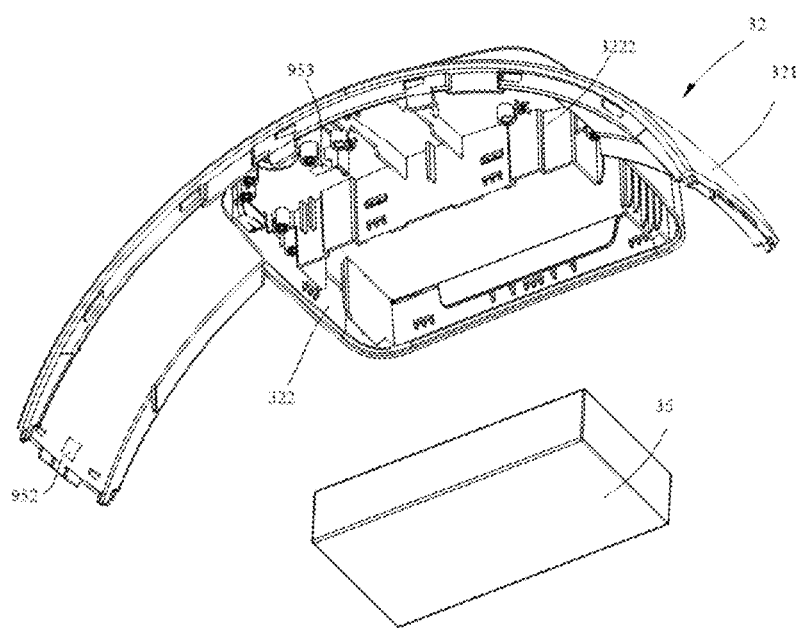
FIG. 17 is a perspective assembly view of a bottom rear housing of the second housing assembly in FIG. 13, which shows an assembly relationship between the bottom rear housing with a battery.
Figure 27:
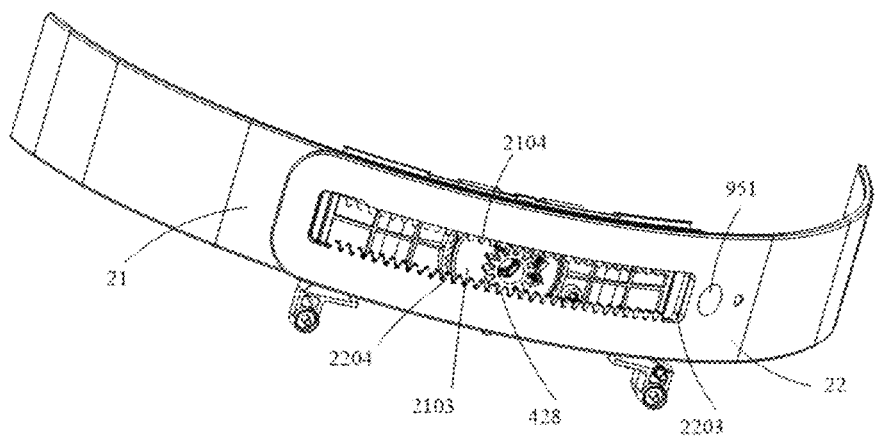
FIG. 27 is a perspective view of the strap assembly being assembled with a part of structures of the tightness adjusting mechanism.
Figure 34:
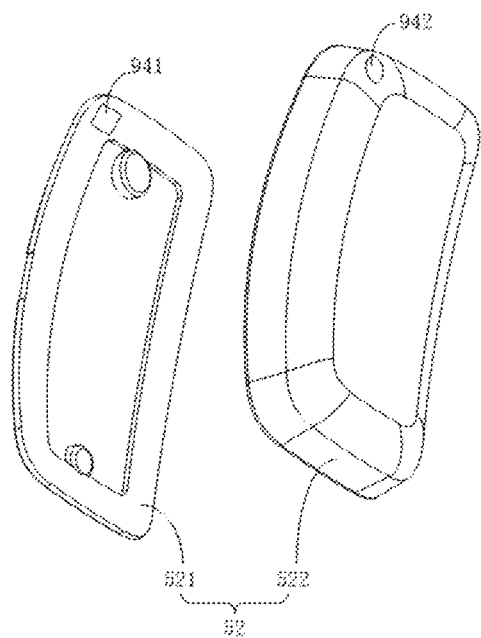
FIG. 34 is a perspective exploded view of the second force-bearing component in FIG. 33, which shows a first sensor arranged on the second force-bearing component.
Figure 37:
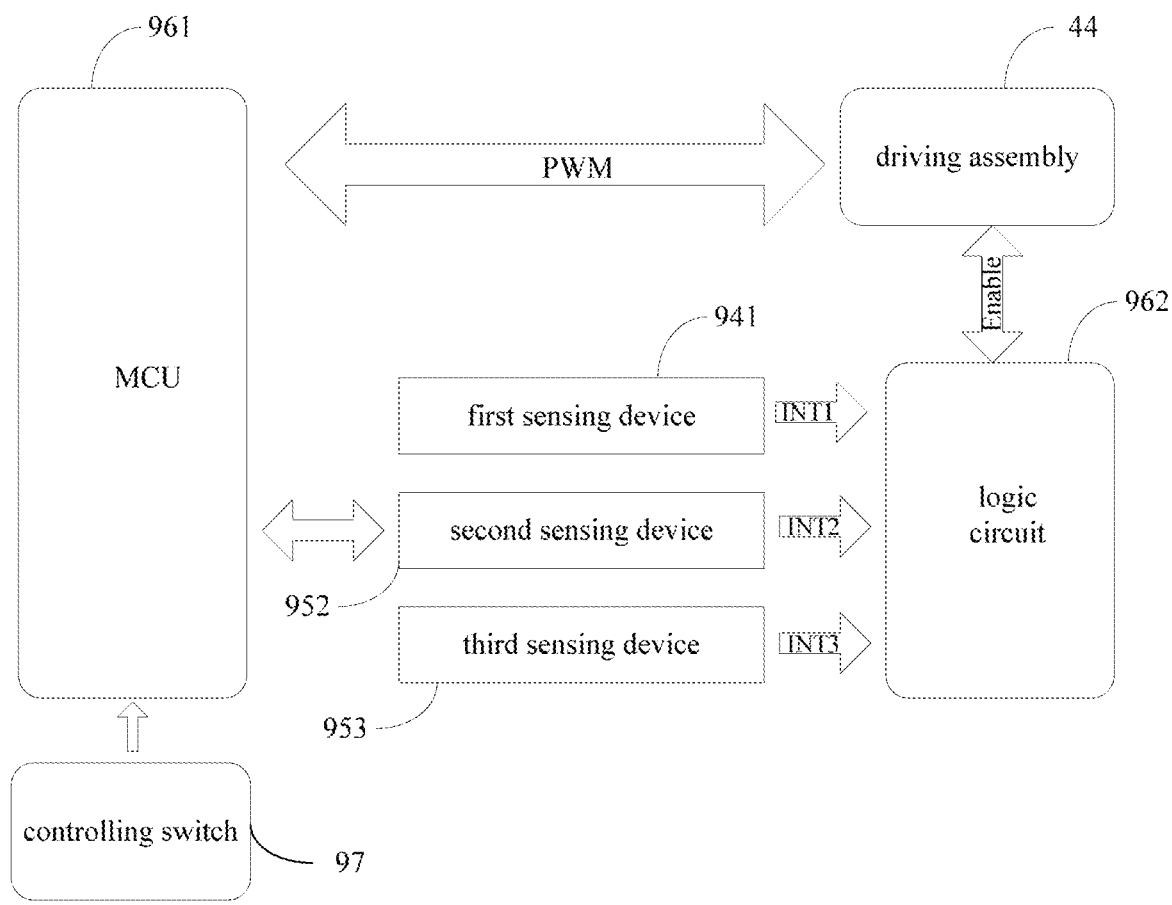
FIG. 37 is an adjusting principle block diagram of the tightness adjusting mechanism according to another embodiment of the present disclosure.

A wearable device is provided in the present disclosure. In some embodiments, the wearable device may be a head-mounted device (such as smart glasses, etc.), a smart watch, a smart belt, and the like. As shown in FIG. 1, a head-mounted device 100 may be used for illustration in some embodiments of the present disclosure. The head-mounted device 100 may include a first housing assembly 10, a strap assembly 20 connected to two ends of the first housing assembly 10, a tightness adjusting mechanism 40 connected to the strap assembly 20, a second housing assembly 30 arranged on the strap assembly 20 and opposite to the first housing assembly 10, a force-bearing assembly 50 arranged on the first housing assembly 10 and the second housing assembly 30, a first sensor (as shown in FIG. 34) arranged on the force-bearing assembly 50, a second sensor (as shown in FIG. 17 and FIG. 27) arranged on at least one of the tightness adjusting mechanism 40 and the strap assembly 20, and a controlling switch (as shown in FIG. 37). In some embodiments, the first housing assembly 10, the strap assembly 20, the second housing assembly 30, and the tightness adjusting mechanism 40 may be assembled to obtain a tightness-adjustable frame, such that the head-mounted device 100 may be easily worn on the head of the user. The force-bearing assembly 50 is arranged on an upper side and a lower side of the frame and configured to share a weight of the head-mounted device 100 applied to the head of the user. Both the first sensor and the second sensor are configured to detect a stretching state of the strap assembly 20.

Figure 2:
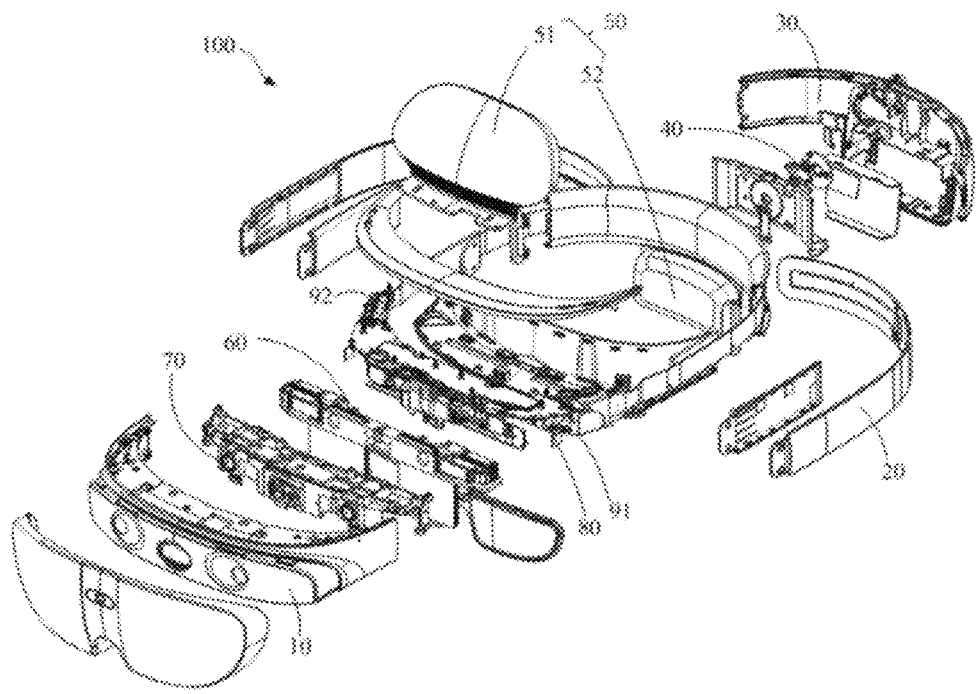
FIG. 2 is an exploded perspective view of the head-mounted device in FIG. 1.
Figure 3:
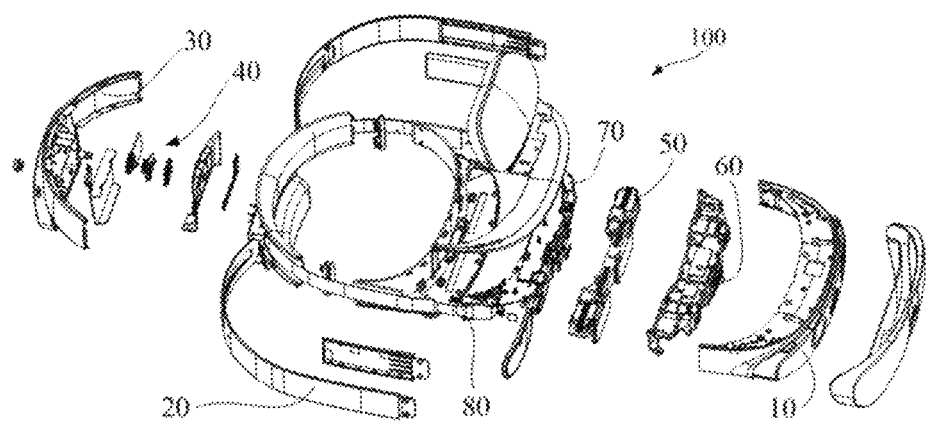
FIG. 3 is an exploded perspective view of the head-mounted device in FIG. 1 from another view.

As further shown in FIG. 2 and FIG. 3, the head-mounted device 100 of some embodiments of the present disclosure may further include a host accommodated in the first housing assembly 10. The host may include an optical-mechanical assembly 60, a camera assembly 70, a motherboard 80, a speaker assembly 91, a microphone assembly 92, etc. Since the first housing assembly 10 is configured to accommodate and protect the host, the first housing assembly 10 may also be referred to as a host housing or a protection housing. The first housing assembly 10 and the host accommodated in the first housing assembly 10 may be assembled to obtain a host assembly. The head-mounted device 100 may be VR glasses, AR glasses, or the like. In some embodiments of the present disclosure, the AR glasses are taken as an example for description.

In the example of AR glasses, the head-mounted device 100 may be configured to transmit data to and receive data from an external processing device through a signal connection. The signal connection may be wired connection, wireless connection, or a combination of the wired connection and the wireless connection. However, in other cases, the head-mounted device 100 may be configured as an independent device. That is, data is processed by head-mounted device 100 itself. The signal connection may be configured to carry any kind of data, such as image data (e.g., a still image and/or a fully motion video, including a 2D and a 3D image), audios, multimedia, voices and/or any other type of data. The external processing device may be, for example, a game console, a personal computer, a tablet computer, a smartphone, or other type of processing devices. The signal connection may be, for example, Universal Serial Bus (USB) connection, Wi-Fi connection, Bluetooth or Bluetooth Low Energy (BLE) connection, Ethernet connection, cable connection, DSL connection, cellular connection (e.g., 3G, LTE/4G or 5G) or a combination thereof. In addition, the external processing device may be configured to communicate with one or more other external processing devices via a network. The network may be or include, for example, a local area network (LAN), a wide area network (WAN), an intranet, a metropolitan area network (MAN), a global Internet, or a combination thereof.

The first housing assembly 10 of the head-mounted device 100 may be installed with a display assembly, an optical element, a sensor, a processor, and the like. In the example of AR glasses, the display component may be designed to, for example, overlap an image on a user's view of a real-world environment, by projecting light into eyes of the user. The head-mounted device 100 may also include an ambient light sensor, and an electronic circuit system to control at least some of above-described components and perform associated data processing functions. The electronic circuit system may include, for example, one or more processors and one or more memories.

Figure 4:
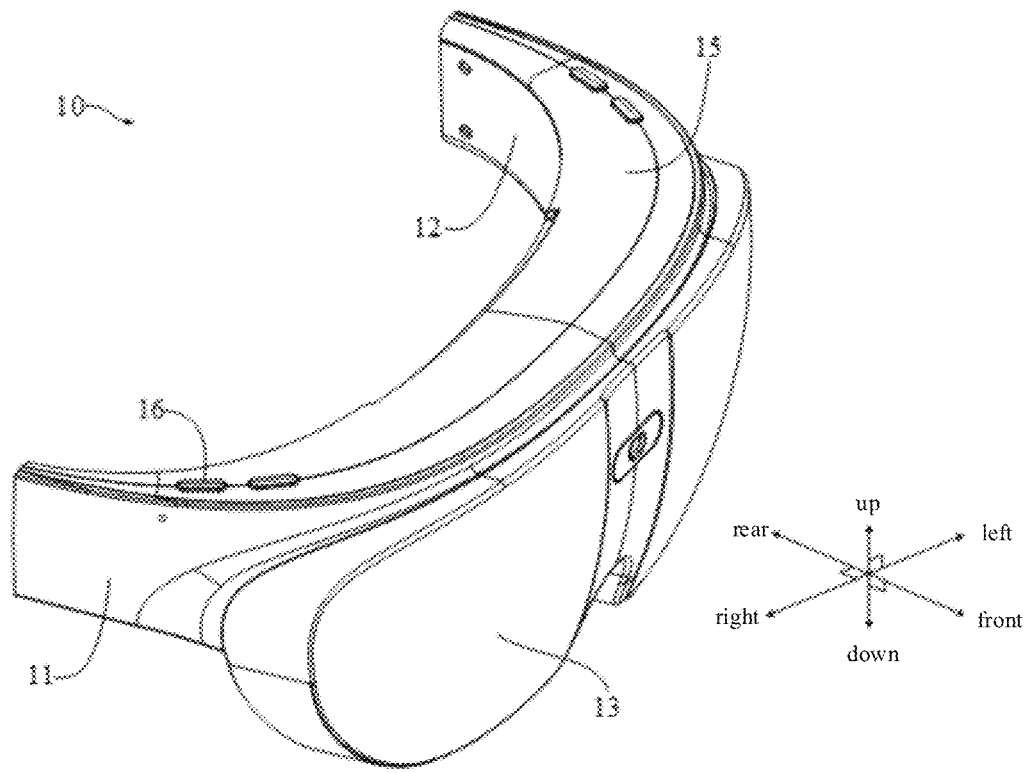
FIG. 4 is a perspective assembly view of a first housing assembly of the head-mounted device according to some embodiments of the present disclosure.
Figure 5:
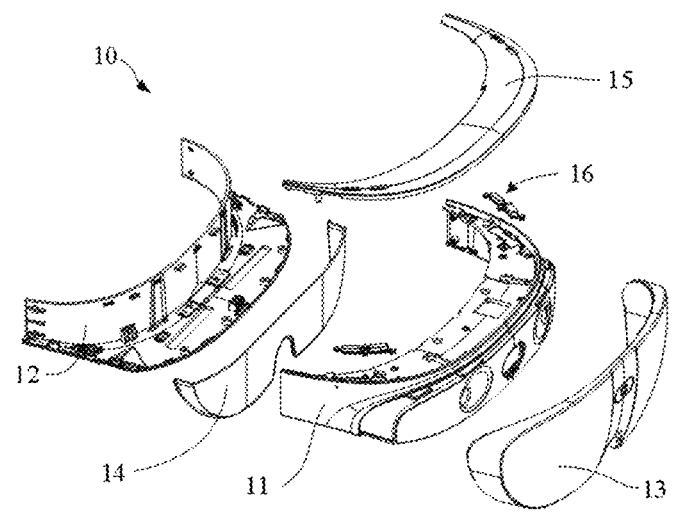
FIG. 5 is an exploded perspective view of the first housing assembly in FIG. 4.

As shown in FIG. 4 and FIG. 5, FIG. 4 shows a perspective assembly view of a first housing assembly 10 of the head-mounted device 100, and FIG. 5 shows an exploded perspective view of the first housing assembly 10 in the embodiments of the present disclosure. The first housing assembly 10 may include a main front housing 11, a main rear housing 12 engaging with the main front housing 11 through a snap-fit connection, a mask 13 arranged in front of the main front housing 11, a rear cover 14 located below the main rear housing 12 and engaged with a lower portion of the mask 13, and a housing decoration component 15 arranged on a top of the main front housing 11.

Herein, the description will be made with reference to orientations "upper", "lower", "front", "rear", "left", and "right" indicated in FIGS. 1 and 4. It should be understood that orientations or position relationships indicated by terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on orientations or position relationships shown in the accompanying drawings, which are only for a convenience to describe the present disclosure and simplifying the description, rather than indicating or implying that the indicated devices or elements must have a specific orientation, or a construction and an operation must be in a particular orientation. Therefore, these above terms should not be construed as limitations to the present disclosure.

Figure 6:
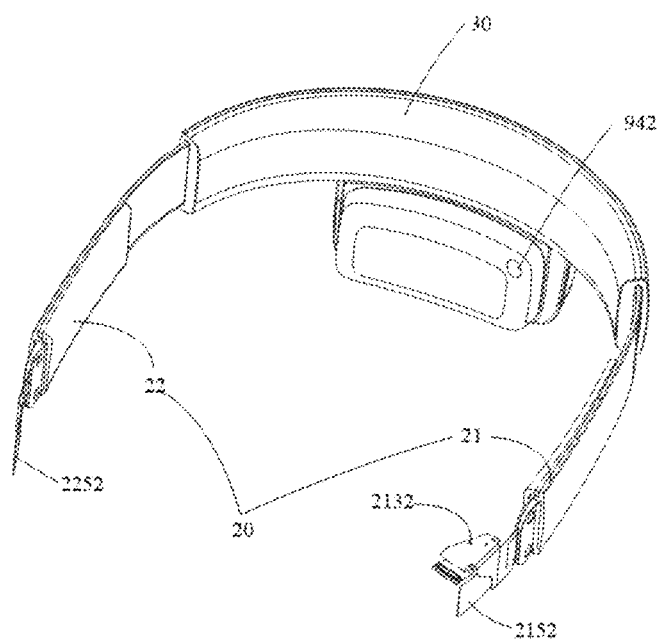
FIG. 6 is a perspective assembly view of a strap assembly and a second housing assembly in FIG. 1.

As shown in FIG. 6, FIG. 6 shows is a perspective assembly view of a strap assembly 20 and a second housing assembly 30 in the embodiments of the present disclosure. The strap assembly 20 may include two head straps, a first head strap 21 and a second head strap 22, respectively.

As shown in FIG. 1, one end of the first head strap 21 is connected to one corresponding end of the first housing assembly 10, and the other end of the first head strap 21 extends into a corresponding end of the second housing assembly 30 and is further connected to the tightness adjusting mechanism 40. The second head strap 22 may be configured in a similar manner as the first head strap 21.

Figure 7:
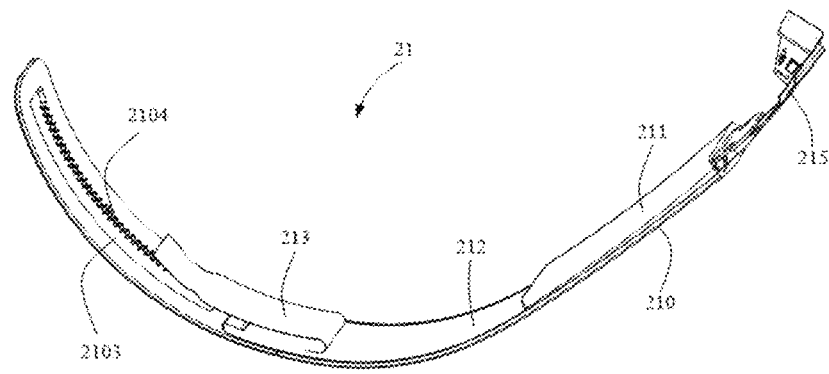
FIG. 7 is a perspective assembly view of a first head strap of the strap assembly in FIG. 6.
Figure 8:
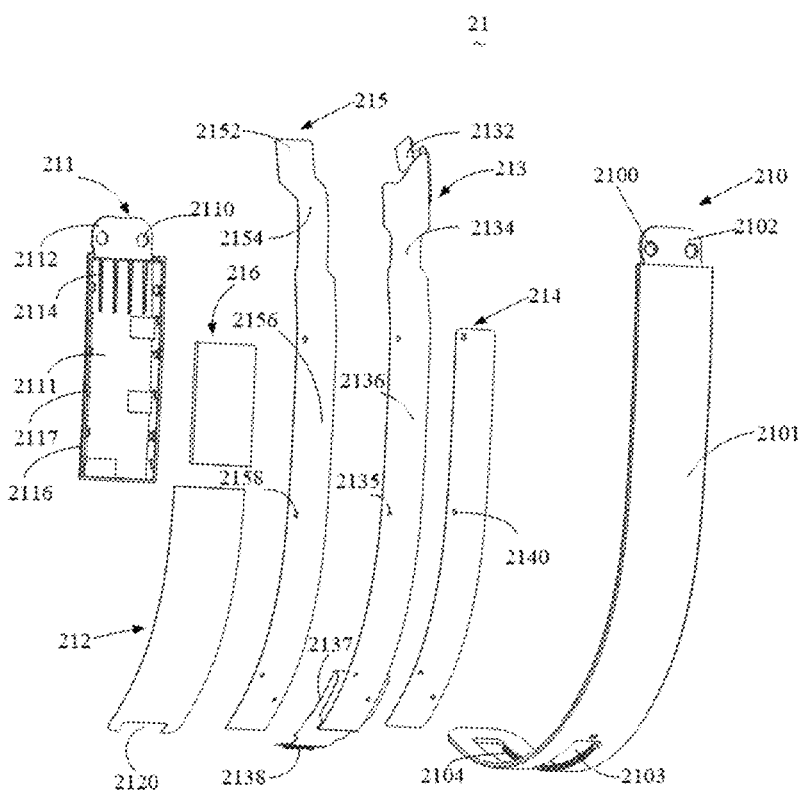
FIG. 8 is a perspective exploded view of the first head strap in FIG. 7.

As shown in FIG. 7 and FIG. 8, FIG. 7 shows a perspective assembly view of the first head strap 21, and FIG. 8 shows a perspective exploded view of the first head strap 21. The first head strap 21 may include a first strap body 210, a first strap cover 211 buckled to or engaged with the first strap body 210, a first flexible strip 212, a power supply FPC 213, a protection sheet 214, and a heat dissipation sheet 215. The first strap body 210, the first strap cover 211, the first flexible strip 212, the power supply FPC 213, the protection sheet 214, and the heat dissipation sheet 215 are disposed between and pressed by the first strap body 210 and the first strap cover 211.

The first strap body 210 may be made of a flexible material, may be bent arbitrarily, and may be substantially in a strip shape. The first strap body 210 may include a first body portion 2101 and a first mounting portion 2102 extending from an end of the first body portion 2101.

The first body portion 2101 has a uniform width. A first length-adjusting hole 2103 is defined at an end of the first body portion 2101 away from the first mounting portion 2102. The first length-adjusting hole 2103 is a strip-shaped through hole. A first sawtooth wave 2104 is arranged on a wall of the first length-adjusting hole 2103 defined in the first body portion 2101, and extends along a length direction of the strip-shaped through hole to be engaged with the tightness adjusting mechanism 40.

Figure 9:
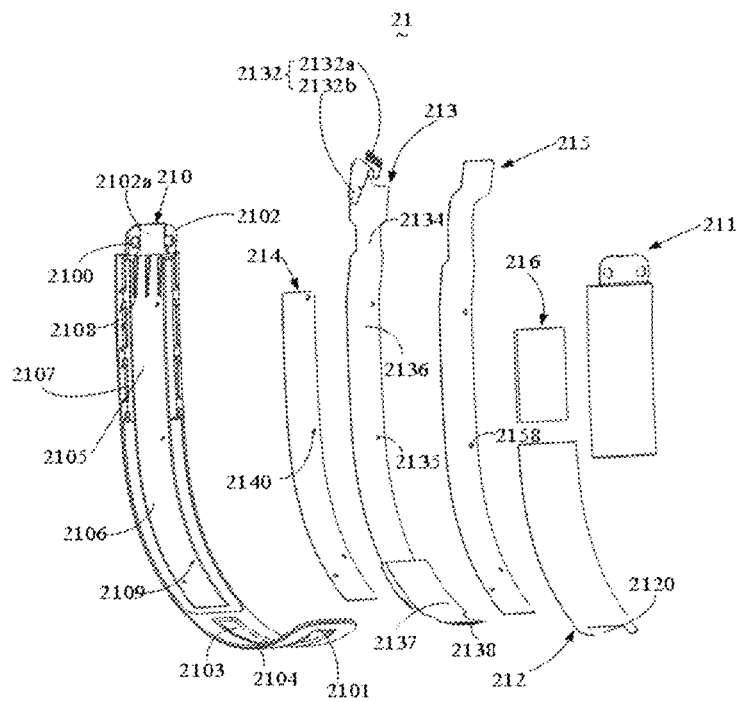
FIG. 9 is similar to FIG. 8, and is a perspective exploded view of the first head strap from another view.

As shown in FIG. 9, FIG. 9 shows a perspective exploded view of the first head strap 21 of the present disclosure from another view. A side of the first body portion 2101 that is pressed against the first strap cover 211 may define an elongated groove, and a shape of the elongated groove may be the same as a shape of the first head strap 21. The elongated groove may be divided into two grooves, that is, a first sub groove 2105 and a second sub groove 2106 fluidly connected to the first sub groove 2105. A depth of the first sub groove 2105 is the same with a depth of the second sub groove 2106, while a width of the first sub groove 2105 is greater than a width of the second sub groove 2106. The groove extends to a position in which the first mounting portion 2102 is located from a position adjacent to the first length-adjusting hole 2103. The second sub groove 2106 is in a stepped shape. An outermost step of the second sub groove 2106 may be configured to accommodate the first flexible strip 212. Each of two side edges of the first body portion 2101 adjacent to two side walls of the first sub groove 2105 is arranged with a first connector 2107. In an embodiment, the first connector 2107 may be multiple hooks that are evenly distributed and spaced apart from each other. A first fixing portion 2108 may be arranged on a wall of the first sub groove 2105. The first fixing portion 2108 may be multiple protruding ribs with a gradually changing thickness. A top surface of each of the protruding ribs may be inclined. An end of each of the protruding ribs abuts against the first mounting portion 2102.

Multiple first restriction posts 2109 are arranged on a wall of the groove of the first body portion 2101 and configured to fix the power supply FPC 213, the protection sheet 214, and the heat dissipation sheet 215.

Two first connection holes 2100 are defined in the first mounting portion 2102. A recess 2102a is defined between the two first connection holes 2100.

As shown in FIG. 8, the first strap cover 211 may be made of a rigid material. The first strap cover 211 may be configured to be buckled with the first strap body 210 at a side of the first strap body 210 close to or near the first mounting portion 2102, and to press an end of the first flexible strip 212 close to the first mounting portion 2102 tightly.

The first strap cover 211 may include a first body 2111 and a first assembly portion 2112 extending from an end of the first body 2111 away from the first flexible strip 212.

The first body 2111 has a uniform width. A shape of the first strap cover 211 corresponds to a shape of the first body portion 2101, but a length of the first body 2111 is less than a length of the first body portion 2101. One first side wall 2116 extends from one side edge in a width direction of the first body 2111 along a direction facing towards the first body portion 2101, and the other first side wall 2116 extends from the other side edge in a width direction of the first body 2111, along the direction facing towards the first body portion 2101. The two first side walls 2116 have two inner side faces facing towards each other, and each of the two inner side faces is arranged with a second connector 2117. The second connector 2117 may be engaged with the first connector 2107 to fix the first strap cover 211 to the first strap body 210. A second fixing portion 2114 may be arranged on an end of the first strap cover 211 connected to the first assembly portion 2112. When the first strap cover 211 is buckled to the first strap body 210, the second fixing portion 2114 of the first strap cover 211 may be engaged with the first fixing portion 2108 of the first strap body 210 to press tightly and fix the power supply FPC 213 and the heat dissipation sheet 215 between the first strap body 210 and the first strap cover 211. A structure of the second fixing portion 2114 may be similar to a structure of the first fixing portion 2108. The second fixing portion 2114 may also be multiple protruding ribs with gradually changing thicknesses. A top surface of each of the protruding ribs 2114 is inclined and an end of each of the protruding ribs 2114 abuts against the first assembly portion 2112.

A shape of the first assembly portion 2112 is the same with a shape of the first mounting portion 2102. Second connection holes 2110 are defined on the first assembly portion 2112. When the first assembly portion 2112 is attached to first mounting portion 2102, the first connection holes 2100 are aligned with and fluidly coupled to the second connection holes 2110, and a through hole is defined at a position at which the recess 2102a is defined.

The first flexible strip 212 is made of a flexible material, may be bent arbitrarily, and may substantially be in a strip shape. A material of the first flexible strip 212 may be the same as that of the first strap body 210. The first flexible strip 212 may be adhered to the second sub groove 2106 of the first strap body 210 by means of gluing and the like. In this way, an outer surface of the first flexible strip 212 may be substantially flush with an outer surface of the first strap body 210, that is, flush with a surface close to the head of the user. A notch 2120 is defined at an end of the first flexible strip 212. When the first flexible strip 212 is adhered to the second sub groove 2106, the first flexible strip 212 and the first strap body 210 cooperatively define a first through hole at a position at which the notch 2120 is defined. The first through hole is fluidly coupled to the second sub groove 2106 to allow the power supply FPC 213 to pass through.

As shown in FIGS. 7, 8 and 9, a shape of the power supply FPC 213 is adapted to the first strap body 210, but a length of the power supply FPC 213 is greater than the first strap body 210. One end of the power supply FPC 213 extends beyond one corresponding end of the first strap body 210, and the other end of the power supply FPC 213 extends beyond the other end of the first strap body 210. The power supply FPC 213 may include a power supply FPC 2132 extending into the first housing assembly 10 and connected to the motherboard 80 and/or the microphone assembly 92, a power supply FPC neck portion 2134 received or further engaged in the through hole and connected to the first electrical connection portion 2132, a power supply FPC body 2136 fixed in the first sub groove 2105 and the second sub groove 2106, a movable portion 2137 passing through the first through hole and arranged outside the second sub groove 2106, and a second electrical connection portion 2138 arranged at an end of the movable portion 2137 and connected to a battery 35.

The first electrical connection portion 2132 includes a wiring portion 2132a and a further wiring portion 2132b. When the strap assembly 20 extends into the first housing assembly 10, the wiring portion 2132a is connected to the motherboard 80, and the further wiring portion 2132b is connected to the speaker assembly 91.

As further shown in FIGS. 8 and 9, a width of the power supply FPC neck portion 2134 is less than a width of each portion of the power FPC at two adjacent sides of the power supply FPC neck portion 2134, for example, a width of the power supply FPC body 2136. The power supply FPC neck portion 2134 is fixedly received or engaged in the first through hole to reduce a possibility that the power supply FPC 213 may be loose.

As shown in FIGS. 8 to 9, a plurality of first insertion holes 2135 are defined in the power supply FPC body 2136. When the power supply FPC body 2136 is received in the first sub groove 2105 and the second sub groove 2106, the power supply FPC body 2136 is fixed by inserting the first restriction posts 2109 in the first insertion holes 2135.

A shape of the protection sheet 214 is adapted to each of a shape of the first sub groove 2105 and a shape of the second sub groove 2106, such that the protection sheet 214 may be accommodated in the corresponding first sub groove 2105 or the second sub groove 2106. For example, the protection sheet 214 is accommodated in an innermost step of the second sub groove 2106, and the first sub groove 2105. A plurality of second insertion holes 2140 are defined in the protection sheet 214. The protection sheet 214 is fixed by placing the first restriction posts 2109 in the second insertion holes 2140. The protection sheet 214 is accommodated in the first sub groove 2105 and the second sub groove 2106 to directly contact the first body portion 2101, so as to reduce a possibility of the power supply FPC body 2136 directly contacting with the first body portion 2101.

A shape of the heat dissipation sheet 215 is similar to a shape of the power supply FPC 213. The heat dissipation sheet 215 is arranged between the first strap cover 211 and the power supply FPC 213, and may include a first attaching portion 2152 extending into the first housing assembly 10, a first heat-dissipation neck portion 2154 received or further engaged in the through hole and connected to the first attaching portion 2152, and a first heat-dissipation body 2156 fixed in the first sub groove 2105 and the second sub groove 2106. For example, the first attaching portion 2152 may be attached to the speaker assembly 91.

A width of the first heat-dissipation neck portion 2154 is less than a width of each portion of the heat dissipation sheet 215 at both sides of the first heat-dissipation neck portion 2154, for example, a width of the first heat-dissipation body 2156. As shown in FIG. 6, it can be seen that the first heat-dissipation neck portion 2154 is fixedly received or engaged in the through hole, such that a possibility of the heat dissipation sheet 215 being loose may be reduced. Third insertion holes 2158 are defined in the first heat-dissipation body 2156. When the first heat-dissipation body 2156 is arranged in the first sub groove 2105 and the second sub groove 2106, the first heat-dissipation body 2156 may be fixed by placing the first restriction posts 2109 in the third insertion holes 2158. The first fixing portion 2108 may be configured to cooperate with the second fixing portion 2114 to press tightly against the first heat-dissipation body 2156 between the first strap body 210 and the first strap cover 211.

A filling 216 may be arranged between the heat dissipation sheet 215 and the first strap cover 211. The filling 216 may be a foam and configured to fill space between the first strap cover 211 and first strap body 210. The filling 216 may also be a thermally conductive material and configured to improve a heat conduction effect of the heat dissipation sheet 215.

As shown in FIG. 8 and FIG. 9, when assembling the first head strap 21, the protection sheet 214, the power supply FPC 213 and the heat dissipation sheet 215 are stacked in sequence to obtain a first assembly, such that the second insertion holes 2140, the first insertion holes 2135, and the third insertion holes 2158 are aligned with each other in sequence. Then, the first assembly is received in the first sub groove 2105 and the second sub groove 2106 of the first strap body 210 to allow the first restriction posts 2109 to pass through the second insertion holes 2140, the first insertion holes 2135 and the third insertion holes 2158 in sequence. The first flexible strip 212 is embedded in and configured to cover the outermost step of the second sub groove 2106, and the first flexible strip 212 and the second sub groove 2106 may be bonded by a glue, such that the first flexible strip 212 and the first body portion 2101 of the first strap body 210 may cooperatively define the first through hole at the position at which the notch 2120 is defined. In this way, the movable portion 2137 of the power supply FPC 213 may be able to pass through the first through hole. In addition, the power supply FPC neck portion 2134 of the power supply FPC 213 and the first heat-dissipation neck portion 2154 may be arranged inside the recess 2102a. The filling 216 is arranged on the first body 2111 of the first strap cover 211, and then the first strap cover 211 is buckled to the first strap body 210 to make the first connector 2107 be connected to the second connector 2117. In addition, the first mounting portion 2102 is buckled to the first assembly portion 2112 to form a connecting portion. The connecting portion is configured to be connected to one corresponding end of the first housing assembly 10. In this way, an assembly of the first head strap 21 is completed.

It can be understood that the first strap cover 211 is buckled to the first strap body 210. The first strap cover 211 and a corresponding portion of the first strap body 210 may cooperatively define an accommodation cavity. Further, the accommodation cavity is defined by the first body portion 2101 being buckled to the first strap cover 211 at the position at which the first sub groove 2105 is located. The accommodation cavity may be configured to accommodate the protection sheet 214, the power supply FPC 213, the heat dissipation sheet 215 and the filling 216. The second sub groove 2106 is fluidly coupled to the accommodation cavity.

Figure 10:
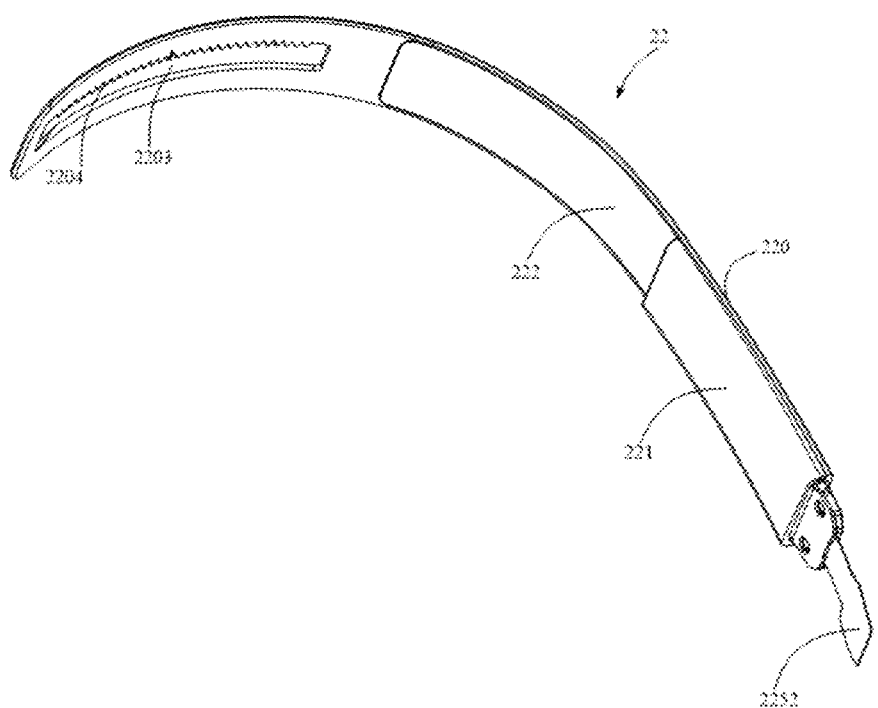
FIG. 10 is a perspective assembly view of a second head strap of the strap assembly in in FIG. 6.
Figure 11:
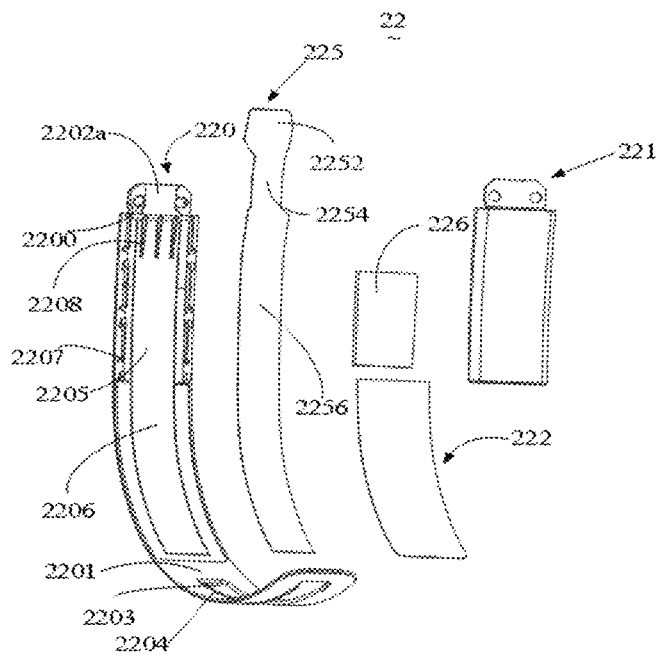
FIG. 11 is a perspective exploded view of the second head strap in FIG. 10.
Figure 35:
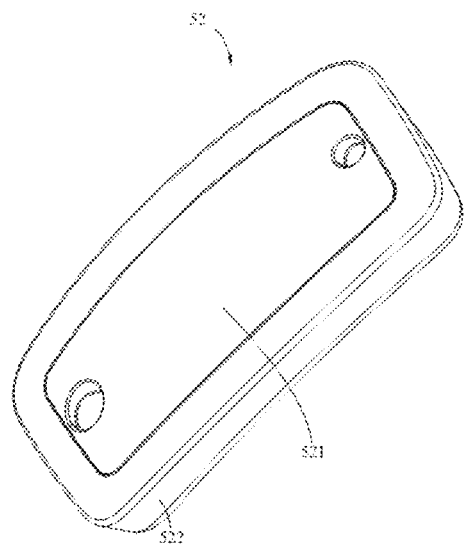
FIG. 35 is a perspective assembly view of the second force-bearing component in FIG. 34.

As shown in FIG. 10 and FIG. 11, FIG. 10 is a perspective assembly view of the second head strap 22 of the present disclosure, and FIG. 11 is a perspective exploded view of the second head strap 22 of the present disclosure. The second head strap 22 is similar to the first head strap 21, and a difference between the second head strap 22 and the first head strap 21 is that the second head strap 22 is not arranged with the power supply FPC and the protection sheet. The second head strap 22 may include a second strap body 220, a second strap cover 221, a second flexible strip 222, and a second heat dissipation sheet 225. The second flexible strip 222 and the second heat dissipation sheet 225 may be pressed between the second strap body 220 and the second strap cover 221. A structure of the second strap body 220 is substantially the same with a structure of the first strap body 210, as shown in FIG. 35 for details, which will not be described in detail herein, and only main components of the second strap body 220 will be listed. Specific cooperating relationships and functions may refer to a description for the first strap body 210. The second strap body 220 may include a second body portion 2201 and a second mounting portion 2202. The second body portion 2201 includes a second length-adjusting hole 2203, a second sawtooth wave 2204, a first groove 2205, and a second groove 2206. A first connector 2207 may be arranged on each of two side edges of the second body portion 2201 near side walls of the first groove 2205. A first fixing portion 2208 may be arranged on a wall of the first groove 2205 close to or adjacent to the second mounting portion 2202. Two first connection holes 2200 are defined in the second mounting portion 2202, and a recess 2202a is defined between the two first connection holes 2200. The first connection holes 2200 are configured to connect the second head strap 22 to a structure such as a protruding column on the first housing assembly 10.

Figure 12:
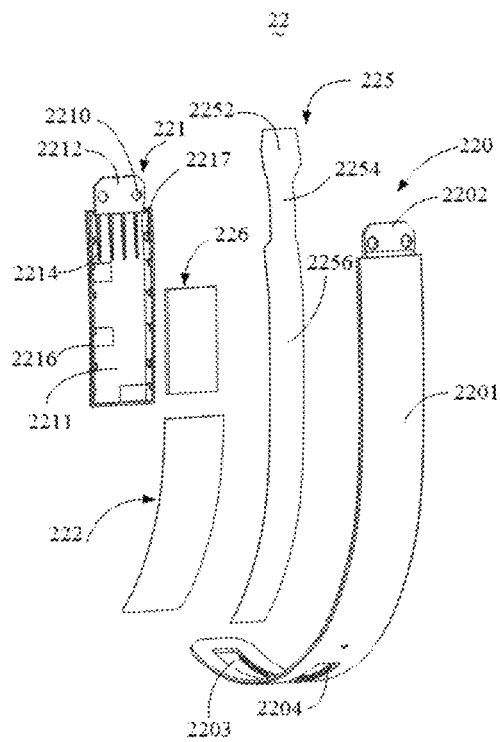
FIG. 12 is similar to FIG. 11, and is a perspective exploded view of the second head strap from another view.

As shown in FIG. 12, FIG. 12 shows a perspective exploded view of the second head strap 22 of the embodiments of the present disclosure from another view. A structure of the second strap cover 221 is substantially the same with a structure of the first strap cover 211, which will not be described in detail herein, and only main components of the second strap cover 221 will be listed. Specific cooperating relationships and functions may refer to a description for the first strap cover 211. The second strap cover 221 may include a second body 2211 and second assembly portion 2212. The second body 2211 may include a second fixing portion 2214, a second side wall 2216, and a second connector 2217. Two second connection holes 2210 are defined in the second assembly portion 2212.

The second flexible strip 222 is made of a flexible material, may be bent arbitrarily, and may substantially be in a strip shape. A material of the second flexible strip 222 may be the same as a material of the second strap body 220. The second flexible strip 222 may be adhered to a wall of the second groove 2206 of the second strap body 220 by means of gluing and the like, such that an outer surface of the second flexible strip 222 flushes with an outer surface of the second strap body 220, that is, a surface close to the head of the user.

A structure of the second heat dissipation sheet 225 is substantially the same with a structure of the heat dissipation sheet 215. The second heat dissipation sheet 225 may include a second attaching portion 2252 extending into the first housing assembly 10, a second heat-dissipation neck portion 2254 received or engaged in the through hole and connected to the second attaching portion 2252, and a second heat-dissipation body 2256 fixed in the first groove 2205 and the second groove 2206. The second attaching portion 2252 may be attached to the speaker assembly 91.

A width of the second heat-dissipation neck portion 2254 is less than a width of each portion of the heat dissipation sheet at both sides of the first heat-dissipation neck portion 2154, for example, the second heat-dissipation body 2256. As shown in FIG. 6, it can be seen that the second heat-dissipation neck portion 2254 is fixedly received or engaged in the through hole, such that a possibility of the second heat dissipation sheet 225 being loose may be reduced.

When the second heat-dissipation body 2256 is arranged in the second groove 2205 and the second groove 2206, the first fixing portion 2208 may be configured to cooperate with the second fixing portion 2214 to fix the second heat-dissipation body 2256 between the second strap body 220 and the second strap cover 221.

A filling 226 may be arranged in a region of the second strap cover 221 where the second connector 2217 is arranged. The filling 216 is arranged between the second heat dissipation sheet 225 and the second strap cover 221. The filling 216 may be a foam and configured to fill space between the second strap cover 221 and second strap body 220. The filling 226 may also be a thermally conductive material and configured to improve a heat conduction effect of the second heat dissipation sheet 225.

As shown in FIG. 11 to FIG. 12, when assembling the second head strap 22, the second heat dissipation sheet 225 is firstly arranged in the first groove 2205 and the second groove 2206 of the second strap body 220. Then, the second flexible strip 222 is embedded in and configured to cover an outermost step of the second groove 2206, and the second flexible strip 222 and the second groove 2206 may be bonded by the glue. After that, the second heat dissipation sheet 2254 is arranged in the recess 2202a. At this moment, the filling 226 is arranged on the second strap cover 221, and the second strap cover 221 is buckled to the second strap body 220 to make the first connectors 2207 be connected to the second connectors 2217. In addition, the second mounting portion 2202 is buckled to the second assembly portion 2212 to form a connecting portion. The connecting portion is configured to be connected to one corresponding end of the first housing assembly 10. In this way, an assembly of the second head strap 22 is completed.

It can be understood that the second strap cover 221 is buckled to the second strap body 220. The second strap cover 221 and a corresponding portion of the second strap body 220 may cooperatively define an accommodation cavity. Further, the accommodation cavity is defined by the second body portion 2201 being buckled to the second strap cover 221 at the position of the first groove 2205. The accommodation cavity may be configured to accommodate the second heat dissipation sheet 225 and the filling 226. The second groove 2206 is fluidly coupled to the accommodation cavity.

When the first head strap 21 and the second head strap 22 are connected to the first housing assembly 10, the first head strap 21 and the second head strap 22 may be connected to the first housing assembly 10 by engaging the first connection holes 2100 and the second connection holes 2110 with the structure such as the protruding column on the first housing assembly 10.

It can be understood that the first head strap 21 and the second head strap 22 may also be integrated as one-piece structure, that is, configured as one head strap. For example, one end of the head strap may be overlapped with the other end of the head strap. A middle portion of the head strap may be connected to the host housing. A tightness adjustment of the strap assembly 20 may be completed by adjusting a length of an overlapped portion. In a case that the first head strap 21 and the second head strap 22 are configured as one head strap, other connection manners may also be adopted, which will not be limited herein.

In the present disclosure, a length of the strap assembly 20 may be a whole or total length of the first head strap 21 and the second head strap 22 after the first head strap 21 is connected to the second head strap 22, that is, a length from an end of the first head strap 21 connected to the first housing assembly 10 to an end of the second head strap 22 connected to the first housing assembly 10. The whole length has a relationship with an overlapping length between the first head strap 21 and the second head strap 22. The shorter the overlapping length, the longer the whole length of the strap assembly 20. The longer the overlapping length, the shorter the whole length of the strap assembly 20. A length of the strap assembly 20 has a first state and a second state. The first state is a state that the overlapping length between the first head strap 21 and the second head strap 22 is the shortest, that is, a state that the whole length of the strap assembly 20 is the longest. The second state is a state that the overlapping length between the first head strap 21 and the second head strap 22 is the longest, is a state that the whole length of the strap assembly 20 is the shortest.

Figure 13:
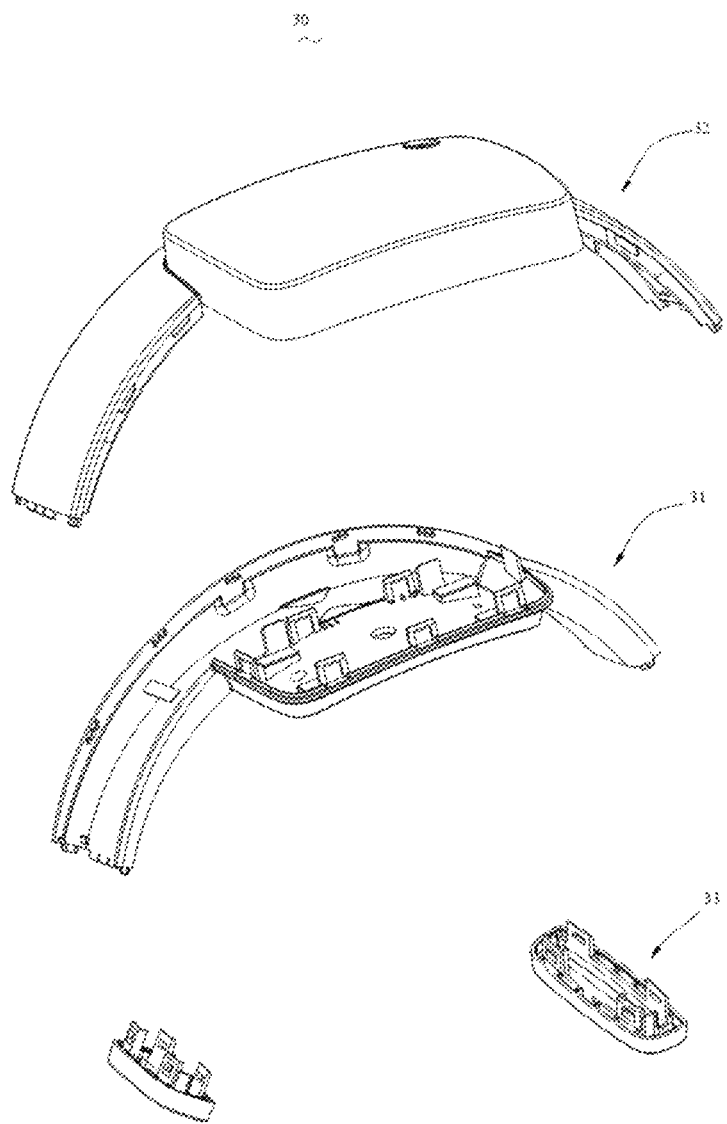
FIG. 13 is a perspective exploded view of the second housing assembly.
Figure 14:
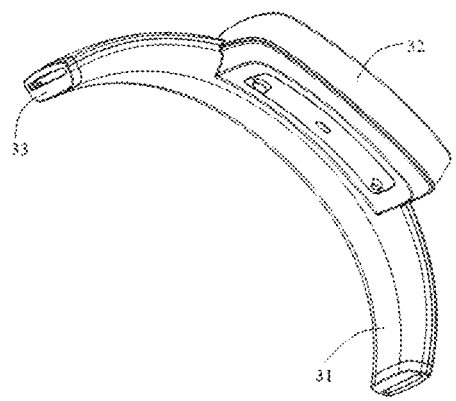
FIG. 14 is a perspective assembly view of the second housing assembly.

As shown in FIG. 13 and FIG. 14, FIG. 13 shows a perspective exploded view and FIG. 14 shows a perspective assembly view of the second housing assembly 30 in an embodiment. The second housing assembly 30 may include a bottom front housing 31, a bottom rear housing 32 and a connector 33 connecting the bottom front housing 31 and the bottom rear housing 32. The second housing assembly 30 is configured to accommodate the strap assembly 20 and the tightness adjusting mechanism 40.

Figure 15:
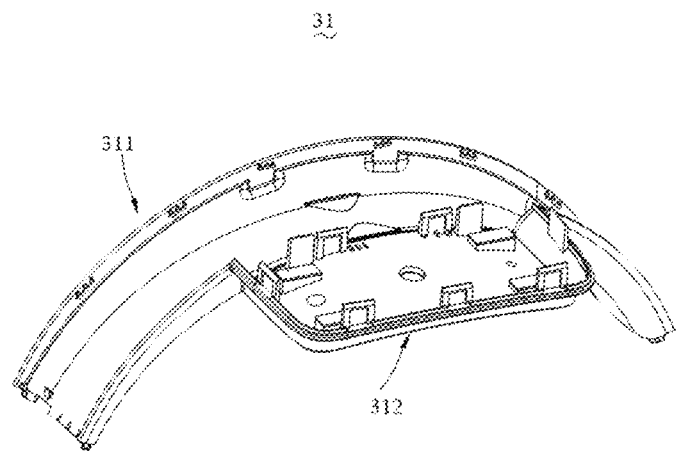
FIG. 15 is a perspective view of a bottom front housing of the second housing assembly in FIG. 13.
Figure 16:
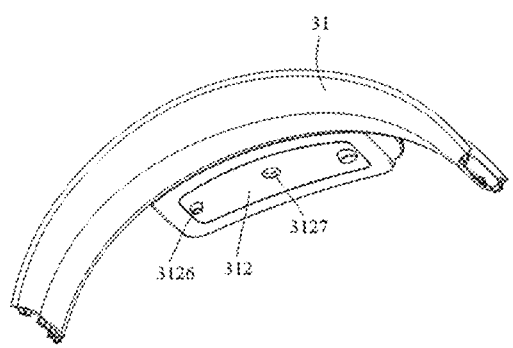
FIG. 16 is similar to FIG. 15, and is a perspective view of the bottom front housing from another view.

As shown in FIG. 15 and FIG. 16, the bottom front housing 31 may be made of a rigid material, and may include a first channel housing 311 and a first power supply housing 312 extending downwardly from the first channel housing 311. As shown in FIG. 17, the bottom rear housing 32 may be made of a rigid material, may include a second channel housing 321 corresponding to the first channel housing 311 and a second power supply housing 322 corresponding to the first power supply housing 312. The battery 35 may be arranged inside the second power supply housing 322. The second power supply housing 322 and the battery 35 arranged inside the second power supply housing 322 may constitute a power supply assembly. The second channel housing 321 and the second power supply housing 322 are separated from each other through a partition board 3222.

After the bottom front housing 31 is buckled to the bottom rear housing 32, the first channel housing 311 and the second channel housing 321 may cooperatively define a channel to receive the strap assembly 20. After the first power supply housing 312 cooperates with the second power supply housing 322, a space defined above the partition board 3222 may be defined as a first accommodation cavity, and a space defined below the partition board 3222 may be defined as a second accommodation cavity. The first accommodation cavity is fluidly coupled to the channel, and a first channel may be defined by the first accommodation cavity and the channel together. The first accommodation cavity may not only accommodate the first head strap 21 and the second head strap 22 which are overlapped each other, but also accommodate the tightness adjusting mechanism 40 to adjust a length of an overlapping portion between the first head strap 21 and the second head strap 22. Therefore, a solid portion that defines the channel and the first accommodating cavity may also be defined as a housing (may also be defined as a first housing) for the head strap and the tightness adjusting mechanism. The second accommodation cavity is configured to accommodate a power source, such as the battery 35, and may be defined as a power supply housing (may be defined as a second housing).

Understandably, after the bottom front housing 31 is engaged with the bottom rear housing 32, the first power supply housing 312, the second power supply housing 322, and a body of the first channel housing 311 may be defined as a first housing, while a portion of the first channel housing 311 and the second channel housing 321 located on both sides of the first housing may be defined as the second housing.

Above-mentioned various terms, for example, the channel, the accommodation cavity, the first accommodation cavity, the second accommodation cavity, the first housing, the second housing, the housing for the head strap and the tightness adjusting mechanism, the power supply housing, may be adjusted based on an actual situation, and the present disclosure is not limited to the above terms. Terms of similar structures may be interchangeable based on the actual situation. For example, the channel may also be referred to as the first accommodation cavity, and in this case, the previous first accommodation cavity may be referred as the second accommodation cavity, the previous second accommodation cavity may be referred as a third accommodation cavity. Terms of the first housing and the second housing may also be interchangeable.

Figure 18:
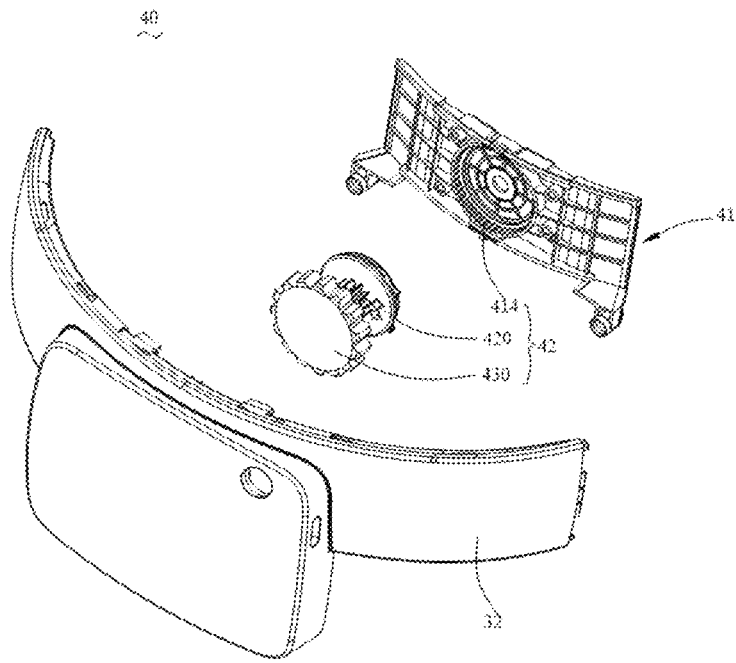
FIG. 18 is a perspective exploded view of a tightness adjusting mechanism.

As shown in FIG. 18, FIG. 18 shows a perspective exploded view of the tightness adjustment mechanism 40 in the embodiments of the present disclosure. The tightness adjusting mechanism 40 may include a first housing 41, and a second housing engaged with the first housing 41 (in this case, the second housing may be the bottom rear housing 32 of the second housing assembly 30 described above, and the bottom rear housing 32 may be a common or share element of the tightness adjusting mechanism 40 and the second housing assembly 30), a ratchet-pawl mechanism 42, and a driving assembly 44. The first housing 41 is engaged with the second housing to form a box. A body portion of the ratchet-pawl mechanism 42 and the driving assembly 44 may be accommodated in the box. The two head straps (i.e., the first head strap 21 and the second head strap 22) of the strap assembly 20 may extend into an inner side of the box, and be overlapped with each other and further connected to the ratchet-pawl mechanism 42. The length of the overlapping portion between the first head strap 21 and the second head strap 22 may be adjusted through the ratchet-pawl mechanism 42. In the present embodiment, the second housing is not a necessary element, and the tightness adjusting mechanism 40 may also be obtained only through assembling the ratchet-pawl mechanism 42 to the first housing 41.

Figure 19:
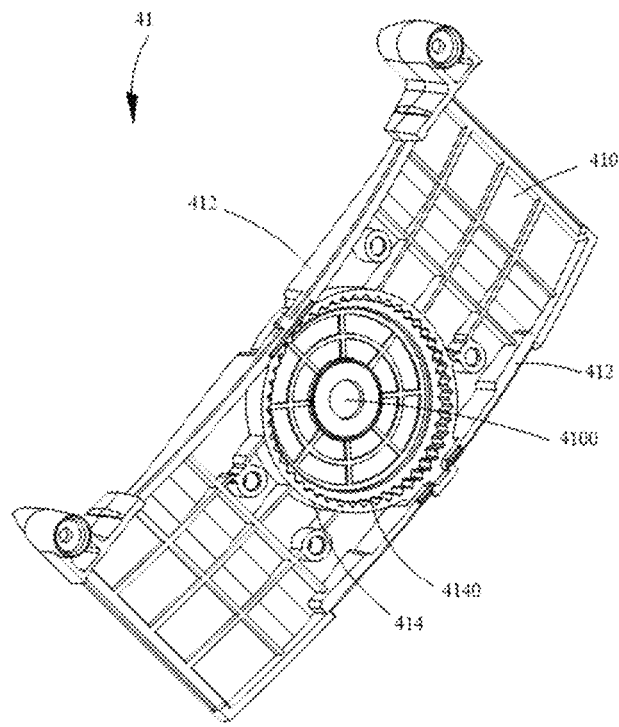
FIG. 19 is a perspective view of a first housing in FIG. 18.
Figure 20:
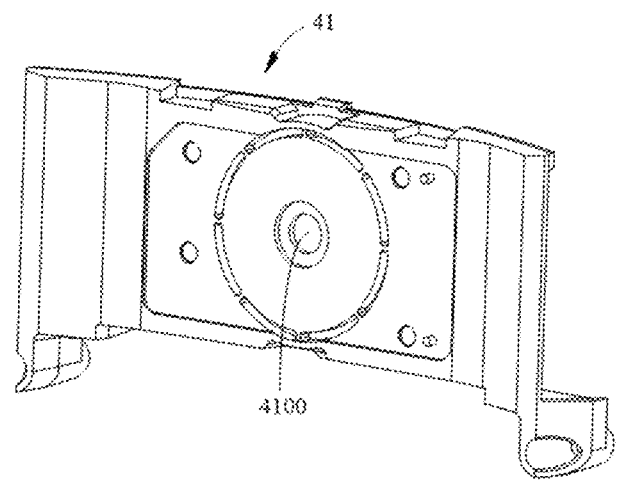
FIG. 20 is similar to FIG. 19, and is a perspective view of the first housing in FIG. 19 from another view.

As shown in FIG. 19 and FIG. 20, FIG. 19 shows a perspective view of the first housing 41, and FIG. 20 shows a perspective view of the first housing 41 from another view. The first housing 41 may include a bottom plate 410. The bottom plate 410 may be a rectangular plate with a uniform thickness. A central hole 4100 is defined in a center of the bottom plate 410.

Two side plates 412 may be arranged on two opposite long edges of the bottom plate 410 and further extend towards the second housing (i.e., the bottom rear housing 32). A height of each of the side plates 412 is gradually decreased from a middle to both sides of the side plates 412, such that a surface of each of the side plates 412 facing the second housing may be arc-shaped, such that the side plates 412 may be in close contact with the second housing.

Figure 21:
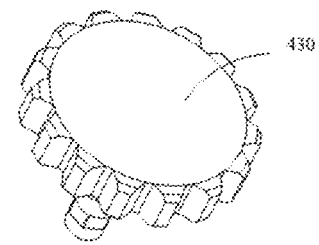
FIG. 21 is a perspective exploded view of a ratchet-pawl mechanism in FIG. 18.
Figure 21:
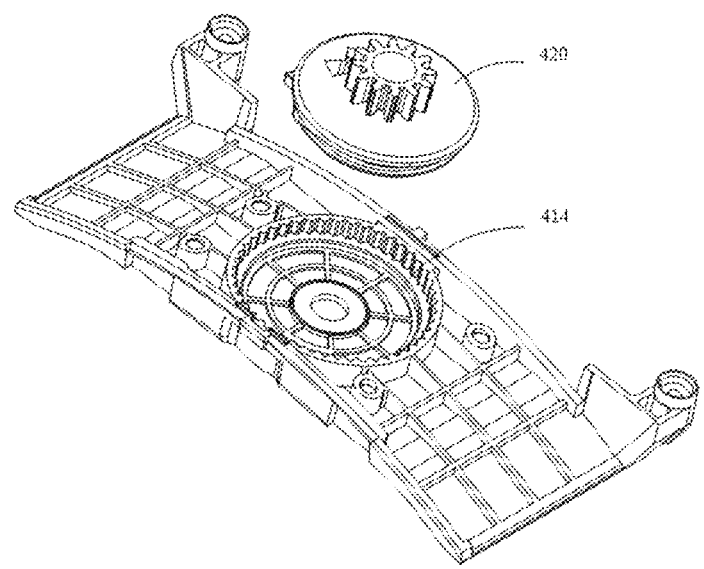

As shown in FIG. 21, the ratchet-pawl mechanism 42 may include a ratchet 414 arranged on the first housing 41, a pawl assembly 420 engaged with and accommodated in the ratchet 414, and a transmission gear 430 engaged with the pawl assembly 420 and configured to drive the pawl assembly 420 to rotate.

As shown in FIG. 21, the pawl assembly 420 may include a first shielding plate 421, a second shielding plate 422 fixedly connected to the first shielding plate 421, a rotating plate 423 located between the first shielding plate 421 and the second shielding plate 422, a first pawl 424, a second pawl 425, a first spring 426, a second spring 427, and an engaging gear 428. The first pawl 424, the second pawl 425, the first spring 426, and the second spring 427 may be assembled on the second shielding plate 422. The engaging gear 428 may be fixedly arranged on a side of the second shielding plate 422 away from the first shielding plate 421.

The first shielding plate 421 may be a circular plate. A central hole 4210 is defined in a center of the first shielding plate 421. The central hole 4210 may be aligned with the central hole 4100 defined in the ratchet 414. A center axis of the central hole 4210 is coaxial with a center axis of the central hole 4100. A first connection portion 4212 and a second connection portion 4214 are arranged on a surface of the first shielding plate 421 facing towards the second shielding plate 422. The second connection portion 4214 is in a prism shape, and the first connection portion 4212 is in a cylinder shape. Protruding ribbings are arranged on an outer peripheral wall of each of the first connection portion 4212 and the second connection portion 4214, such that the protruding ribbings may cooperate with a corresponding structure of the second shielding plate 422 to make the first shielding plate 421 be fixedly connected to the second shielding plate 422.

Figure 23:
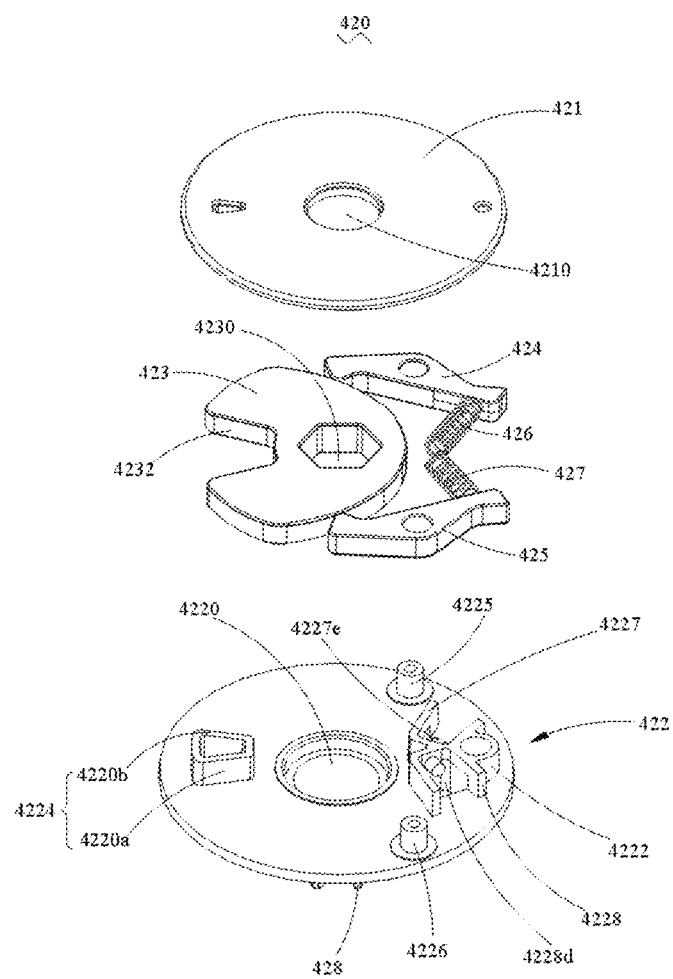
FIG. 23 is similar to FIG. 22, and is a perspective exploded view of the pawl assembly in FIG. 21 from another view.

As shown in FIG. 23, a shape of the second shielding plate 422 is the same with a shape of the first shielding plate 421, and a size of the second shielding plate 422 is the same with a size of the first shielding plate 421. A central hole 4220 is defined in a center of the second shielding plate 422. The central hole 4220 may be aligned with the central hole 4210 of the first shielding plate 421. A first buckling portion 4222 and a second buckling portion 4224 are arranged on a surface of the second shielding plate 422 facing towards the first shielding plate 421. A shape of the second buckling portion 4224 is the same with a shape of the second connection portion 4214 of the first shielding plate 421, but a size of the second buckling portion 4224 is different from a size of the second connection portion 4214 of the first shielding plate 421, such that the second connection portion 4214 of the first shielding plate 421 may be inserted into the second buckling portion 4224. The second buckling portion 4224 may include a first buckling wall 4220a and a second buckling wall 4220b arranged at a certain angle to the first buckling wall 4220a. That is, a distance between the first buckling wall 4220a and the second buckling wall 4220b gradually increases along a direction from the central hole 4220 to an outside. A shape of the first buckling portion 4222 is the same with a shape of the first connection portion 4212 of the first shielding plate 421, but a size of the first buckling portion 4222 is different from a size of the first connection portion 4212, such that the first connection portion 4212 of the first shielding plate 421 may be inserted into the first buckling portion 4222. A first mounting shaft 4225, a second mounting shaft 4226, a first mounting frame 4217, and a second mounting frame 4228 are further arranged on a surface of the second shielding plate 422 facing towards the first shielding plate 421. The first mounting shaft 4225 may be configured to assemble the first pawl 424. The second mounting shaft 4226 may be configured to assemble the second pawl 425. The first mounting frame 4217 may be configured to assemble the first spring 426. The second mounting frame 4228 may be configured to assemble the second spring 427.

The first shielding plate 421 and the second shielding plate 422 may also be configured as one mounting element. The second buckling portion 4224 and the second connection portion 4214 may be configured as a limiting portion to engage with the rotating plate 423, or may be configured as a fixing portion to fix the first shielding plate 421 with the second shielding plate 422. The first buckling portion 4222 and the first connection portion 4212 are configured as another fixing portion to fix the first shielding plate 421 with the second shielding plate 422.

The mounting element is not limited to a manner of the first shielding plate 421 and the second shielding plate 422 being assembled. Any component that allow the first pawl 424 and the second pawl 425 to contact and engage with the ratchet 414 may be taken as the mounting member. That is, a notch or a structure similar to the notch may be defined in the mounting element to enable the first pawl 424 and the second pawl 425 to extend out of a space defined by the mounting element and contact and cooperate with the ratchet 414. Therefore, the mounting element may be a box defining the notch or the structure similar to the notch.

Of course, the mounting element may also be only the first shielding plate 421 or the second shielding plate 422. For example, the mounting element is the second shielding plate 422, and the second buckling portion 4224 and the second connection portion 4214 may be formed on the first shielding plate 421 or the second shielding plate 422 as the limiting portion.

The first mounting shaft 4225 is located on a side of the first buckling portion 4222, the second mounting shaft 4226 is located on another side of the first buckling portion 4222, and the first mounting shaft 4225 and the second mounting shaft 4226 are symmetrically arranged relative to the first buckling portion 4222.

The first mounting frame 4227 and the second mounting frame 4228 are symmetrically arranged relative to the first buckling portion 4222. A shape, a size, and a configuration of the first mounting frame 4227 are completely same with those of the second mounting frame 4228, correspondingly.

Figure 24:
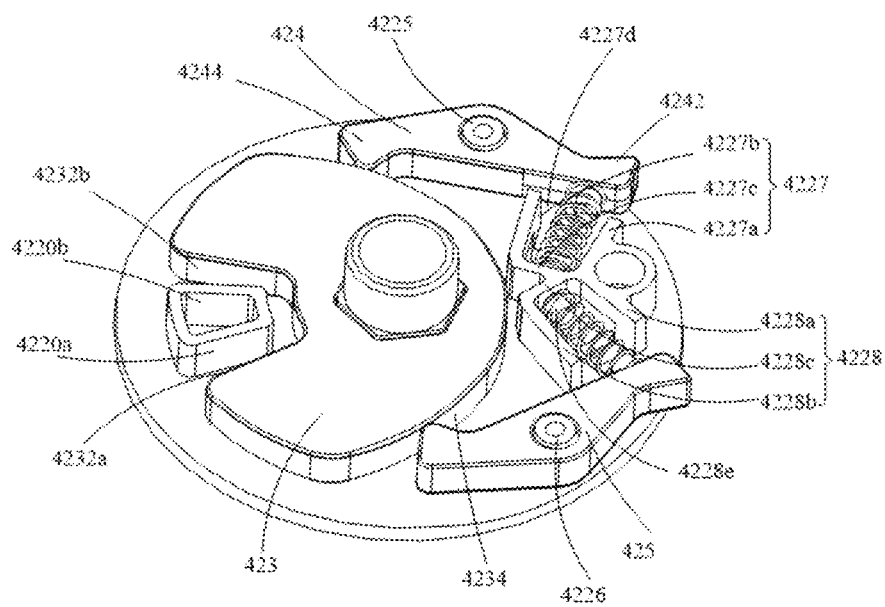
FIG. 24 is a part assembly view of FIG. 23.

As further shown in FIGS. 23 and 24, the first mounting frame 4227 may include a first retaining wall 4227a, a second retaining wall 4227b arranged at a certain angle to the first retaining wall 4227a, and a connecting wall 4227c connecting an end of the first retaining wall 4227a to an end of the second retaining wall 4227b. The first retaining wall 4227a, the second retaining wall 4227b, and the connecting wall 4227c cooperatively define a receiving space 4227d. The receiving space 4227d may be configured to accommodate the first spring 426. The first retaining wall 4227a is configured to extend from an outer peripheral wall of the first buckling portion 4222. A buckling shaft 4227e is arranged on a side of the connecting wall 4227c facing towards the receiving space 4227d, and the first spring 426 is sleeved on the buckling shaft 4227e.

Since a configuration of the second mounting frame 4228 may be the same as that of the first mounting frame 4227, the configuration of the second mounting frame 4228 will not be described in detail herein, and only components of the second mounting frame 4228 are listed. The second mounting frame 4228 may include a first retaining wall 4228a, a second retaining wall 4228b, a connecting wall 4228c, a receiving space 4228d, and a buckling shaft 4228e. The first retaining wall 4227a of the first mounting frame 4227 is connected to the first retaining wall 4228a of the second mounting frame 4228, and an end of the connecting wall 4227c is connected to an end of the connecting wall 4228c.

It should be pointed out that the first spring 426 and the second spring 427 may also be other elastic elements, such as tension springs, compression springs, objects providing extending and retracting forces, etc. In this way, the first pawl 424 and the second pawl 425 may be engaged with the ratchet 414 to complete switching between an engagement state and a non-engagement state. Correspondingly, the second mounting frame 4227 and the second mounting frame 4228 may also be replaced by other structures capable of fixing the elastic elements, based on differences of the elastic elements.

The rotating plate 423 is an eccentric wheel structure with a second through hole 4230. Of course, the rotating plate 423 and the transmission gear 430 may also be integrated at a position of the second through hole 4230. The second through hole 4230 is aligned with the central hole 4220 of the second shielding plate 422, and an axis of the second through hole 4230 is coaxial with the central hole 4220. In an embodiment, an inner surface of the second through hole 4230 may be polygonal, for example, hexagonal. A notch 4232 is defined at an end of the rotating plate 423 away from the second through hole 4230, and has a same shape with a shape of the first buckling portion 4222 of the second shielding plate 422, but has a size different from the first buckling portion 4222. The size of the notch 4232 is greater than the size of the first buckling portion 4222 to accommodate the first buckling portion 4222. In the present embodiment, the second buckling portion 4224 and the second connection portion 4214 are configured as the limiting portion to be engaged in the notch 4232. The notch 4232 includes two opposite inner walls, that is, a first inner wall 4232*a* and a second inner wall 4232*b* opposite to the first inner wall 4232*a*. A peripheral surface of the rotating plate 423 includes an outer wall surface 4234. When the rotating plate 23 is rotated around an axis of the second through hole 4230, only three states may exist between the rotating plate 423 and the second buckling portion 4224. The three states include a first state, a second state, and a third state. In the first state, only the first inner wall 4232*a* contacts with the first buckling wall 4220*a*. In the second state, the rotating plate 423 is not contact with the second buckling portion 4224 (that is, a non-contact state). In the third state, only the second inner wall 4232*b* contacts with the second buckling wall 4220*b*. That is, the limiting portion is configured to be in two states of being contacting or non-contacting with the inner wall surface of the notch 4232, so as to make the rotating plate 423 be rotated a certain angle around a rotating axis (the axis of the second through hole 4230) of the rotating plate 423.

Figure 25:
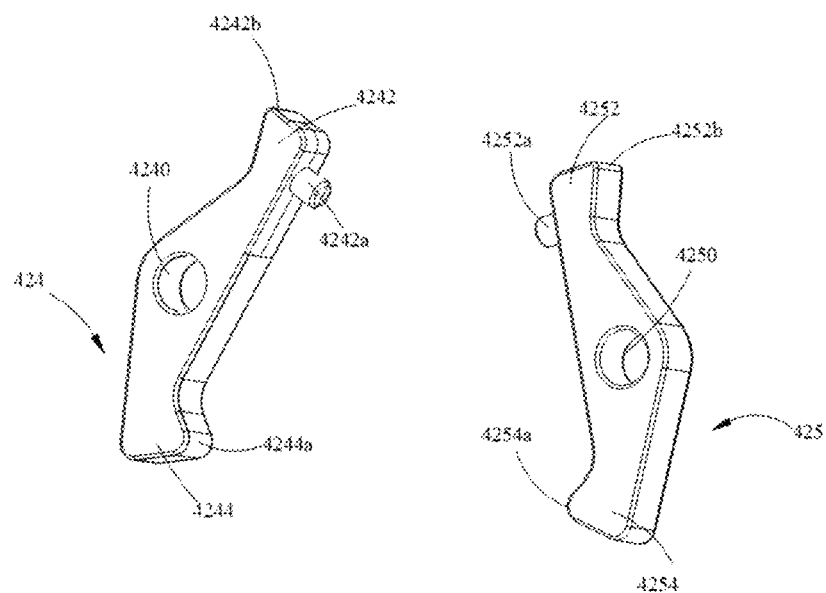
FIG. 25 is a perspective view of two pawls in FIG. 24.
Figure 26:
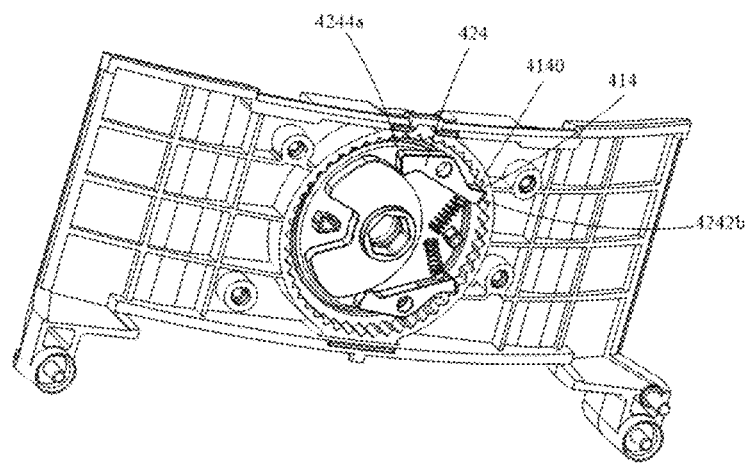
FIG. 26 is a perspective view of a part of components of the pawl assembly being assembled with the first housing in FIG. 21.

As shown in FIGS. 23 to 25, the first pawl 424 is pivotally mounted on the first mounting shaft 4225 arranged on the second shielding plate 422 and may be rotated around the first mounting shaft 4225. A pivot hole 4240 is defined at a middle position of the first pawl 424, and the first mounting shaft 4225 is pivotally received in the pivot hole 4240. The first pawl 424 has two opposite ends, that is, a first end 4242 connected to the first spring 426 and a second end 4244 abutting against the outer wall surface 4234 of the rotating plate 423. A mounting shaft 4242*a* is arranged at a side of the first end 4242 facing towards the receiving space 4227*d* of the first mounting frame 4227, and the first spring 426 may be sleeved on the mounting shaft 4242*a*. A side of the first end 4242 away from the first mounting frame 4227 has a corner 4242*b*, and the corner 4242*b* is configured to be engaged with the inner teeth 4140 of the ratchet 414 (as shown in FIG. 26). A side of the second end 4244 facing towards the rotating plate 423 has a contacting surface 4244*a*. In an embodiment, the contacting surface 4244*a* is curved, so as to be in a linear contact with the outer wall surface 4234 of the rotating plate 423, to reduce a pressure between the contacting surface 4244*a* and the outer wall surface 4234.

The second pawl 425 and the first pawl 424 are symmetrically arranged relative to the first buckling portion 4222 of the second shielding plate 422. A configuration of the second pawl 425 is same with a configuration of the first pawl 424, and a shape of the second pawl 425 is same with a shape of the first pawl 424, which will not be described repeated herein, and only the components of the second pawl 425 are listed. The second pawl 425 may define a pivot hole 4250, and may include a first end 4252, a second end 4254, a mounting shaft 4252*a*, a corner 4252*b*, and a contacting surface 4254*a*.

When assembling the first spring 426, one end of the first spring 426 is sleeved on the buckling shaft 4227*e* in the second mounting frame 4227, and the other end of the first spring 426 is sleeved on the mounting shaft 4242*a* of the first pawl 424, such that the first spring 426 is assembled in the second mounting frame 4227 and the first pawl 424 may be rotated around the first mounting shaft 4225. When the first pawl 424 is rotated, the first end 4242 of the first pawl 424 is driven to move, so as to push the first spring 426 to have compressions of different degrees in the second mounting frame 4227.

Configuration and functions of the second spring 427 are the same as those of the first spring 426, and the second spring 427 is mounted in the second mounting frame 4228, which will not be repeated herein.

The outer wall surface 4234 of the rotating plate 423 is a curved surface, and configured as the following. When the rotating plate 423 is rotated around a rotating axis of the rotating plate 423, the outer wall surface 4234 is configured to drive the first pawl 424 and the second pawl 425 to be rotated, so as to complete the switch between the engagement state and the non-engagement state. As shown in FIG. 24, when no external force is applied to force the rotating plate 423 or the mounting element (a combination of the first shielding plate 421 and the second shielding plate 422) to be rotated, when the rotating plate 423 and an outer surface of the limiting portion (i.e., an outer surface of the second buckling portion 4224) are in the non-contact state due to actions of the first spring 426 and the second spring 427, the rotating plate 423 and the ratchet 414 are in the engagement state. When the rotating plate 423 is forced to be rotated around the axis of the second through hole 4230 under the external force, two states in the following may occur.

(1) The non-contact state may be switched to the state of only the first inner wall 4232*a* contacting with the first buckling wall 4220*a*. In this case, in a direction of the rotating plate 423 being rotated around the axis of the through hole 4230, a distance from a contact position of the first pawl 424 and the outer wall surface 4234 to the second through hole 4230 gradually increases, so as to make the first end 4242 of the first pawl 424 move and be disengaged from the inner teeth 4140 of an inner wall of the ratchet 414. A distance from a contact position of the second pawl 425 and the outer wall surface 4234 to the second through hole 4230 gradually decreases, and the ratchet 414 compresses the second spring 427 of the second pawl 425, such that the second pawl 425 may be disengaged from the inner teeth 4140 of the inner wall of the ratchet 414. Eventually, the pawl assembly 420 may be disengaged from the ratchet 414.

(2) The non-contact state may be switched to the state only the second inner wall 4232*b* contacting with the second buckling wall 4220*b*. In this case, in the direction of the rotating plate 423 being rotated around the axis of the second through hole 4230, the distance from the contact position of the second pawl 425 and the outer wall surface 4234 to the second through hole 4230 gradually increases, so as to make the second end 4254 of the second pawl 425 move and be disengaged from the inner teeth 4140 of the inner wall of the ratchet 414. The distance from the contact position of the first pawl 424 and the outer wall surface 4234 to the second through hole 4230 gradually decreases, and the ratchet 414 compresses the first spring 426 of the first pawl 424, such that the first pawl 424 may be disengaged from the inner teeth 4140 of the inner wall of the ratchet 414. Eventually, the pawl assembly 420 may be disengaged from the ratchet 414.

Figure 22:
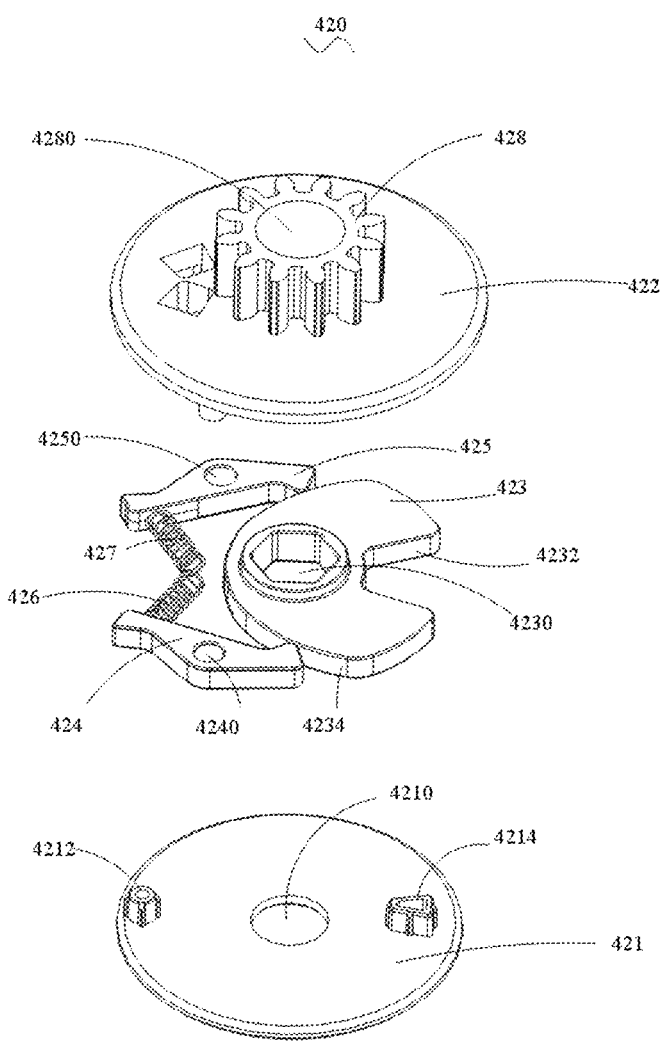
FIG. 22 is a perspective exploded view of a pawl assembly in FIG. 21.

As shown in FIG. 22, a central hole 4280 is defined in the engaging gear 428, and aligned and coaxial with the central hole 4220 of the second shielding plate 422. The engaging gear 428 is fixedly arranged at a side of the second shielding plate 422 away from the first shielding plate 421.

As shown in FIG. 27, when the strap assembly 20 is connected to the tightness adjusting mechanism 40, the end of the first head strap 21 defining the first length-adjusting hole 2103, is stacked or overlapped with the end of the second head strap 22 defining the second length-adjusting hole 2203. In this case, the first sawtooth wave 2104 and the second sawtooth wave 2204 are located on two opposite sides in two stacked length-adjusting holes (i.e., the first length-adjusting hole 2103 and the second length-adjusting hole 2203), respectively. The engaging gear 428 may be received in the two stacked length-adjusting holes (i.e., the first length-adjusting hole 2103 and the second length-adjusting hole 2203) and configured to engage with the first sawtooth wave 2104 and the second sawtooth wave 2204.

Figure 28:
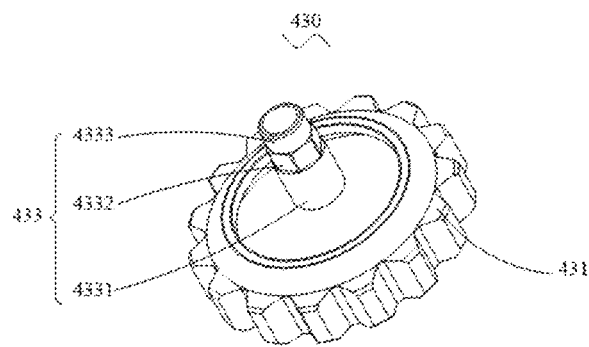
FIG. 28 is a perspective view of a transmission gear in FIG. 21.

As shown in FIG. 28, the transmission gear 430 may include a gear rotating disk 431 and a rotating shaft 433. The rotating shaft 433 may extend from an inner surface of the gear rotating disk 431. The rotating shaft 433 includes a first connection shaft 4331 connected to the gear rotating disk 431, a second connection shaft 4332 connected to the first connection shaft 4331, and a third connection shaft 4333 connected to the second connection shaft 4332. The first connection shaft 4331, the second connection shaft 4332 and the third connection shaft 4333 are coaxially arranged in sequence along an axis direction away from the gear rotating disk 431.

When the engaging gear 428 is received in the two stacked length-adjusting holes (i.e., the first length-adjusting hole 2103 and the second length-adjusting hole 2203) of two stacked head straps (i.e., the first head strap 21 and the second head strap 22), the gear rotating disk 431 is configured to cooperate with the engaging gear 428 and the second shielding plate 422, to limit positions of the first head strap 21 and the second head strap 22, such that a possibility of the first head strap 21 and the second head strap 22 being disengaged from the engaging gear 428 may be reduced.

Both the first connection shaft 4331 and the third connection shaft 4333 may be circular shafts, that is, an outer peripheral surface of the first connection shaft 4331 and an outer peripheral surface of the third connection shaft 4333 are circular. An outer diameter of the first connection shaft 4331 is greater than an outer diameter of the third connection shaft 4333. An outer peripheral surface of the second connection shaft 4332 is a polygon. In an embodiment, the outer peripheral surface of the second connection shaft 4332 is a hexagon, and a distance from a center of the hexagon to any side of the hexagon is less than a radius of the first connection shaft 4331 and greater than a radius of the third connection shaft 4333. A shape and a size of the second connection shaft 4332 match with a shape and a size of the second through hole 4230 of the rotating plate 423, such that the rotating plate 423 may be fixedly connected to the second connection shaft 4332.

When an assembling process is performed for the strap assembly 20, the second housing assembly 30, and the tightness adjusting mechanism 40, first the strap assembly 20 is assembled, and then the first head strap 21 and the second head strap 22 of the strap assembly 20 are configured to pass through one of the connectors 33 respectively. A portion where the first length-adjusting hole 2103 of the first head strap 21 is defined is overlapped with a portion where the second length-adjusting hole 2203 of the second head strap 22 is defined, and then the engaging gear 428 is received in the first length-adjusting hole 2103 and the second length-adjusting hole 2203, the rotating plate 423 is configured to pass through the engaging gear 428, the central hole 4210, and the central hole 4220 defined in the second shielding plate 422. The first pawl 424, the second pawl 425, the first spring 426, the second spring 427, and the rotating plate 423 are mounted on the second shielding plate 422. For example, the rotating plate 423 is configured to pass through the third connection shaft 4333 of the rotating shaft 433 and then sleeved on the second connection shaft 4332, such that the rotating plate 423 may be fixedly arranged relative to the rotating shaft 433; besides, the second buckling portion 4224 on the second shielding plate 422 may be received in the notch 4232 of the rotating plate 423. The first end 4242 of the first pawl 424 and the first end 4252 of the second pawl 425 may contact with the outer wall surface 4234 of the rotating plate 423.

Figure 29:
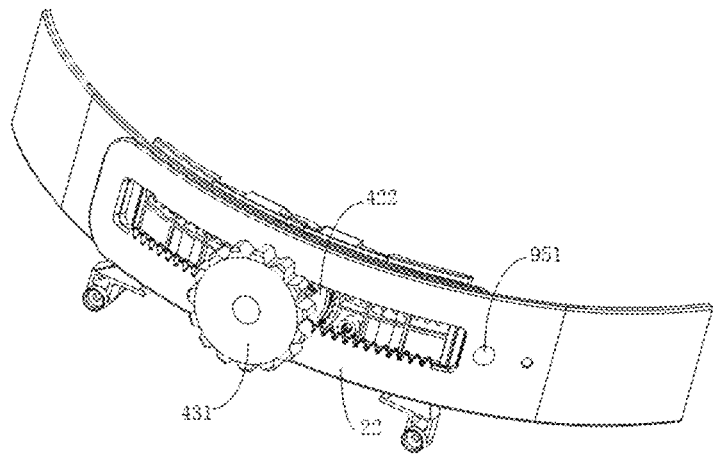
FIG. 29 is similar to FIG. 27, and is another perspective view of the strap assembly being assembled with a part of structures of the tightness adjusting mechanism.

Then the first shielding plate 421 may be buckled to the second shielding plate 422, and the first connection portion 4212 of the first shielding plate 421 is engaged with the first buckling portion 4222 of the second shielding plate 422. In this way, the first shielding plate 421 is assembled with the rotating shaft 433, and the first shielding plate 421 is fixedly arranged relative to the second shielding plate 422, that is, the first shielding plate 421 and the second shielding plate 422 may be simultaneously radially rotated relative to the rotating shaft 433. The first pawl 424, the second pawl 425, the first spring 426, the second spring 427, and the rotating plate 423 are fixed between the first shielding plate 421 and the second shielding plate 422. The pawl assembly 420 is accommodated in the ratchet 414, and the third connection shaft 4333 of the rotating shaft 433 is inserted into and further engaged with the central hole 4100 defined in the ratchet 414. Then, the first housing 41 may be buckled with the bottom rear housing 32. In this case, a bottom of the engaging gear 428 abuts against the gear rotating disk 431, and the gear rotating disk 431 is configured to compress and limit positions of the first head strap 21 and the second head strap 22 (as shown in FIG. 29). The side plates 412 are buckled and fixed with the bottom rear housing 32 to fix the first head strap 21 and the second head strap 22 in the tightness adjusting mechanism 40. So far, an assembly of the strap assembly 20 and the tightness adjusting mechanism 40 is completed.

The bottom front housing 31 is assembled with the first head strap 21 after the battery 35 is placed. Subsequently, the two connectors 33 are assembled, so far, an assembly of the strap assembly 20, the second housing assembly 30 and the tightness adjusting mechanism 40 may be completed.

When adjusting the strap assembly 20, as shown in FIG. 26, in an initial state, the first spring 426 is configured to raise the first pawl 424 to make the first end 4252 be engaged with the inner teeth 4140 of the ratchet 414. The second spring 427 is configured to raise the second pawl 425 to make the first end 4252 be engaged with the inner teeth 4140 of the ratchet 414. In this case, the first pawl 424 and the second pawl 425 contact with the rotating plate 423, such that the rotating plate 423 does not contact with the second buckling portion 4224. The strap assembly 20 may apply a force on the mounting element, such that when the mounting element is rotated in any direction, one pawl may be engaged with the inner teeth 4140 of the ratchet 414. In this way, a limiting portion of the mounting element cannot contact the rotating plate 423 directly, and the first shielding plate 421 may be forced to be unable to perform a rotation and further be engaged with the strap assembly 20, such that a possibility of the strap assembly 20 being loose may be reduced.

When adjusting a length of the strap assembly 20, the transmission gear 430 is configured to drive the rotating plate 423 to be rotated, such that the non-contact state of the rotating plate 423 and the second buckling portion 4224 is switched to the state of only the first inner wall 4232a contacting with the first buckling wall 4220a or the state of only the second inner wall 4232b contacting with the second buckling wall 4220b. Both the state of only the first inner wall 4232a contacting with the first buckling wall 4220a and the state of only the second inner wall 4232b contacting with the second buckling wall 4220b may cause the pawl assembly 420 to be disengaged from the ratchet 414. Further, the first shielding plate 421 is driven to be rotated, such that the engaging gear 428 may be rotated, the first head strap 21 and the second head strap 22 may be moved in opposite directions, and a whole length of the strap assembly 20 may be changed. In this way, a tightness of the strap assembly 20 may be adjusted.

It may be understood that the first housing 41 may also be the bottom front housing 31 in the second housing assembly 30, and the ratchet 414 may be arranged on a body of the first channel housing 311, while the central hole 4100 may also be defined in the body of the first channel housing 311, and the ratchet-pawl mechanism 42 may be engaged with the ratchet 414. In addition, the first head strap 21 is overlapped with the second head strap 22, the first head strap 21 and the second head strap 22 are further connected to the tightness adjusting mechanism 40, and the tightness adjusting mechanism 40 is configured to adjust the overlapping length between the first head strap 21 and the second head strap 22. In this case, a distance from the first strap cover 211 and the second strap cover 221 to the tightness adjusting mechanism 40, a distance from the first strap cover 211 and the second strap cover 221 to the head straps, and a distance from the first strap cover 211 and the second strap cover 221 to the tightness adjusting mechanism housing may be adjusted accordingly. In some embodiments of the present disclosure, the bottom front housing 31 and the bottom rear housing 32 may serve as the housing of the tightness adjusting mechanism 40, serve as a portion of the tightness adjusting mechanism 40. Of course, the housing of the tightness adjusting mechanism may also be formed by the first housing 41 and the bottom rear housing 32.

Figure 30:
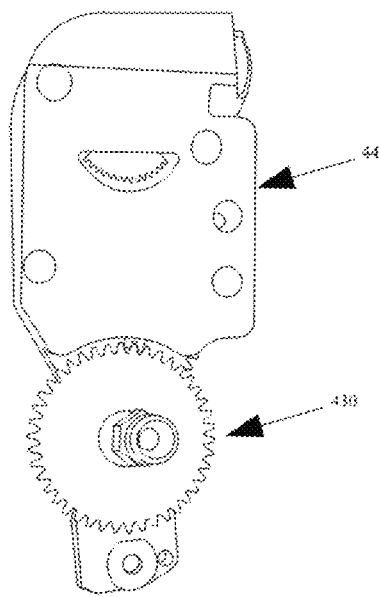
FIG. 30 is an assembly structural schematic view of a driving assembly of the tightness adjusting mechanism and a transmission gear.

As shown in FIG. 30, FIG. 30 is an assembly structural schematic view of a driving assembly of the tightness adjusting mechanism and a transmission gear. The driving assembly 44 may include a motor and a gearbox. The motor may be a stepping motor, an input end of the gearbox is connected to an output shaft of the stepping motor, and a gear at an output end of the gearbox is engaged with the transmission gear 430, such that the transmission gear 430 may be driven to be rotated through the motor. A rotation of the transmission gear 430 may drive the pawl assembly 420 to be rotated, such that the engaging gear 428 may be rotated to drive the first head strap 21 and the second head strap 22 to move relative to each other.

As shown in FIG. 1, FIG. 1 illustrates a perspective assembly view of the head-mounted device 100 according to an embodiment of the present disclosure. The force-bearing assembly 50 includes a first force-bearing component 51 arranged on the first housing assembly 10 and a second force-bearing component 52 arranged on the second housing assembly 30. In some embodiments of the present disclosure, the first housing assembly 10, the strap assembly 20, the second housing assembly 30, and the tightness adjusting mechanism 40 may form an annular frame having an adjustable tightness. The first force-bearing component 51 is located on a side of the annular frame, and the second force-bearing component 52 is located on an opposite side of the annular frame. For example, the first force-bearing component 51 is located on an upper side of the second housing assembly 30, and the second force-bearing component 52 is located on a lower side of the second housing assembly 30. The first force-bearing component 51 is inclined toward a side close to the second force-bearing component 52. In addition, the first force-bearing component 51 is a first force-bearing point, the first housing assembly 10 is a second force-bearing point, and the second force-bearing component 52 is a third force-bearing point. The head-mounted device 100 may be stably supported and worn through the first force-bearing point, the second force-bearing point, and the third force-bearing point.

Figure 31:
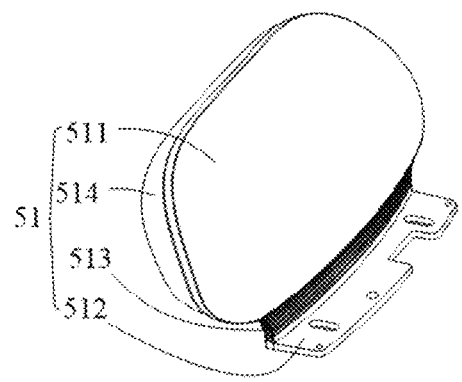
FIG. 31 is a perspective view of a first force-bearing component of a force-bearing assembly in FIG. 1.
Figure 32:
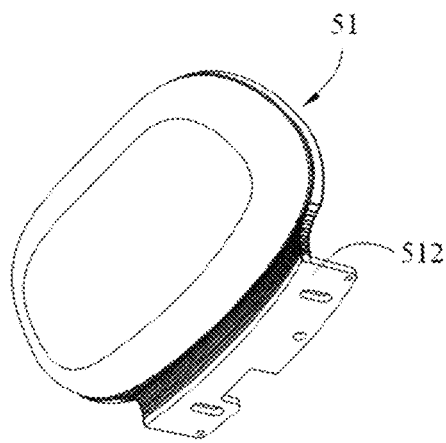
FIG. 32 is similar to FIG. 31, and is a perspective view of the first force-bearing component from another view.

As shown in FIG. 31 and FIG. 32, FIG. 31 illustrates a perspective view of the first force-bearing component 51 in an embodiment, and FIG. 32 illustrates a perspective view of the first force-bearing component 51 from another view in the embodiment. The first force-bearing component 51 may include a supporting plate 511, a mounting plate 512 arranged substantially at a certain angle to the supporting plate 511, a neck portion 513 located between the supporting plate 511 and the mounting plate 512 and configured to connect the supporting plate 511 and the mounting plate 512, and a cushion 514 arranged on the supporting plate 511. The cushion 514 is located at a level higher than a plane where the strap is located; in other words, the cushion 514 protrudes out of the plane where the strap is located.

The supporting plate 511 may be a quadrilateral plate, and a surface of the supporting plate 511 away from the second housing assembly 30 and the cushion 514 may be a curved surface. A surface of the supporting plate 511 where the cushion 514 is arranged may be a concave curved surface, to substantially match with a contour of a forehead of the user or a contour of a portion above the forehead. The supporting plate 511 extends from a side of the mounting plate 512, and is inclined to a side where the cushion 514 is mounted, such that the mounting plate 512 may be arranged at an obtuse angle to the supporting plate 511. The neck portion 513 may have a same extending direction with the supporting plate 511, that is, the neck portion 513 extends from the side of the mounting plate 512, such that the neck portion 513 may be arranged at an obtuse angle to the mounting plate 512. The neck portion 513 may also be bent upward from the mounting plate 512, such that the neck portion 513 may be arranged at a substantially right angle or an acute angle to the mounting plate 512.

The mounting plate 512 may be a plate-shaped structure with a thickness, made of a rigid material, and configured to cooperate and be assembled with a top plate 111 of the main front housing 11 and the housing decoration component 15. For example, the mounting plate 512 may be sandwiched between the top plate 111 and the housing decoration component 15. The neck portion 513 may be made of a rigid material. A shape of the cushion 514 corresponds to a shape of the supporting plate 511 and is fixed on a side of the supporting plate 511 facing toward the second housing assembly 30. The cushion 514 and the mounting plate 512 may be arranged two opposite sides of the supporting plate 511 respectively.

Figure 33:
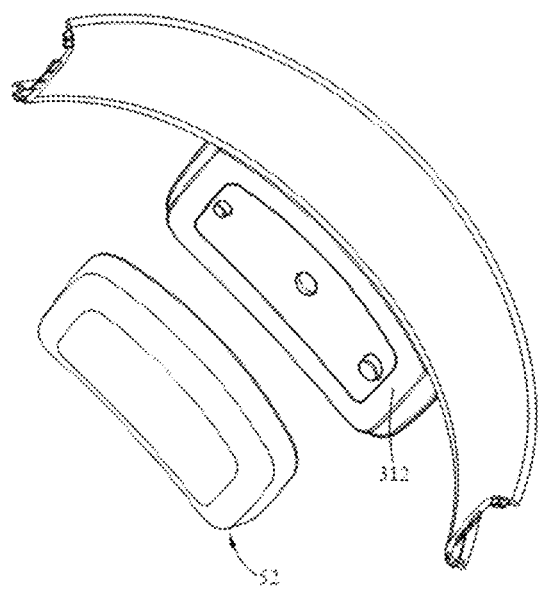
FIG. 33 is an exploded view of a second force-bearing component of the force-bearing assembly and the bottom front housing of the second housing assembly in FIG. 1.

As shown in FIG. 33, FIG. 33 illustrates a perspective exploded view of the second force-bearing component 52 of the force-bearing assembly 50 and the bottom front housing 31 of the second housing assembly 30 in an embodiment. The second force-bearing component 52 is fixed and mounted on the bottom front housing 31 of the second housing assembly 30. As shown in FIGS. 34 to 35, FIG. 34 illustrates a perspective exploded view of the second force-bearing component 52 in an embodiment, and FIG. 35 illustrates a perspective assembly view of the second force-bearing component 52 in the embodiment. The second force-bearing component 52 may include a fixing plate 521 and a cushion 522 covering/surrounding/encompassing the fixing plate 521. A shape of the fixing plate 521 may match with a shape of the first power supply housing 312 of the bottom front housing 31 of the second housing assembly 30. A size of the fixing plate 521 may match with a size of the first power supply housing 311 of the bottom front housing 31. The second force-bearing component 52 may be configured to be fixed on the second housing assembly 30 by means of a snap/buckling/engagement. The second force-bearing component 52 may also be bonded on the second housing assembly 30 by the glue.

When the user wears the head-mounted device 100, since the strap assembly 20 connects the first housing assembly 10 and the second housing assembly 30 to form a wearable annular frame, the second force-bearing component 52 and the first housing assembly 10 are configured as main force-bearing points, and the first housing assembly 10 is configured to contact with the forehead of the user and the second force-bearing component 52 is configured to contact with a back of the head of the user, the user may support the head-mounted device 100 through the forehead and the back of the head of the user. Since the first force-bearing component 51 is disposed at an upper of the forehead and inclined toward the second force-bearing component 52, and contacts with the upper of the forehead of the user, the head-mounted device 100 may be supported stably, such that the user may feel more comfortable to wear.

The first sensor is arranged on the second force-bearing component 52 and configured to detect a deformation parameter value of the cushion 522. The deformation parameter value of the cushion 522 may include a thickness of the cushion 522, a density of the cushion 522, and a light transmittance of the cushion 522, or other deformation parameters.

In the present embodiment, the parameter of the cushion 522 is the thickness of the cushion 522. For example, as shown in FIG. 34, the first sensor may include a first sensing device 941 and a first magnet 942. The first sensing device 941 may be a Hall switch and configured to determine the thickness of the cushion 522 through detecting a magnetic field generated by the first magnet 942. Specifically, the first magnet 942 may be arranged on a side of the cushion 522 away from the fixing plate 521 (as shown in FIGS. 1 and 6), and the Hall switch may be arranged on a side of the fixing plate 521 close to the cushion 522. In some embodiments, the first magnet 942 may also be arranged in the cushion 522, such that a surface of the cushion contacting with a human body may be kept soft and comfortable and not be affected by the by the Hall switch. In this case, the first sensor is configured to detect a thickness of a part of the cushion between the first magnet 942 and the Hall switch. It can be understood that, in other embodiments, the first magnet 942 may also be arranged on the fixing plate 521, and the Hall switch may be arranged on the cushion 522. In some embodiments, the Hall switch may include a Hall element, an amplifier circuit, a temperature compensation circuit, and a regulated power supply circuit integrated on one chip. The Hall element is generally made of a semiconductor wafer and have advantages such as being sensitive to magnetic fields, having a simple structure, having a small size, having a wide frequency response, having a large output-voltage variation and a long service life, and the like. A control current I is provided between two terminals of the Hall element wafer, and a uniform-intensity magnetic field having a magnetic induction intensity B is applied in a vertical direction of the Hall element wafer through a magnet. In this way, a potential difference (that is, a Hall voltage UH) may be generated in a direction substantially perpendicular to the current and the uniform-intensity magnetic field. A relationship between the current I, the magnetic induction intensity B and the Hall voltage UH can be defined as UH=k IB/d, where d is a thickness of the Hall element wafer, k is a Hall coefficient, and a value of k has a relationship with a material of the Hall element wafer. In a case that k, d, I remain unchanged, UH varies with B, and B is related to a distance between the Hall element and the magnet (that is, the thickness of the cushion in the present embodiment). Therefore, the thickness of the cushion may be determined based on the Hall voltage detected by the Hall switch.

Specifically, when the deformation parameter value of the cushion 522 detected by the first sensor reaches a preset threshold, the tightness adjusting mechanism 40 is configured to stop adjusting the length of the strap assembly 20. For example, a thickness of the cushion 522 in a natural state is 1 cm, a preset threshold of the thickness of the cushion 522 is 0.5 cm. When the thickness of the cushion 522 detected by the first sensor is reduced to or less than 0.5 cm, the tightness adjusting mechanism 40 is configured to stop adjusting the length of the strap assembly 20. For example to illustrate, when the user wears the head-mounted device 100, a length of the strap assembly 20 is reduced until the head-mounted device 100 can be stably tied to the head of the user, the thickness of the cushion 522 at this moment is obtained and taken as the preset threshold of the thickness of the cushion 522. Of course, in other embodiments, when the head-mounted device 100 can be tied stably to the head of the user and the user feels more comfortable to the tightness of the strap assembly 20 of the head-mounted device 100, the thickness of the cushion 522 at this moment may be set to be the preset threshold of the thickness of the cushion 522.

The second sensor is configured to detect the length of the strap assembly 20. For example, the second sensor is configured to detect whether the strap assembly 20 is extended to be in the first state or retracted to be in the second state. As shown in FIG. 17 and FIG. 27, the second sensor includes a second magnet 951, a second sensing device 952, and a third sensing device 953. The second sensing device 952 and the third sensing device 953 may be Hall elements. Specifically, the second magnet 951 is fixed on the second head strap 22, and the second sensing device 952 is arranged on the second channel housing 321 of the second housing assembly 30. When the strap assembly 20 is extended to be in the first state, that is, when the overlapping length between the first head strap 21 and the second head strap 22 is the shortest, the second sensing device 952 corresponds to the second magnet 951. The third sensing device 953 is arranged on the second channel housing 321 of the second housing assembly 30, when the strap assembly 20 is shortened to be in the second state, that is, when the overlapping length between the first head strap 21 and the second head strap 22 is the longest, the third sensing device 953 corresponds to the second magnet 951.

In some embodiments, when the strap assembly 20 is extended to be in the first state or retracted to be in the second state, the second magnet 951 is located in the second channel housing 321, and both the second sensing device 952 and the third sensing device 953 are arranged on an inner wall of the second channel housing 321 of the second housing assembly 30.

When the length of the strap assembly 20 reaches the first state, the tightness adjusting mechanism 40 is configured to stop adjusting the length of the strap assembly 20. When the length of the strap assembly 20 reaches the second state, the tightness adjusting mechanism 40 is configured to stop adjusting the length of the strap assembly 20. In some embodiments of the present disclosure, by arranging the second sensor to detect whether the strap assembly 20 is extended to the longest or retracted to the shortest, when the strap assembly 20 is extended to the longest or retracted to the shortest, the tightness adjusting mechanism 40 is configured to stop adjusting the length of the strap assembly 20 to reduce a possibility of rotation jam.

The controlling switch is connected to the tightness adjusting mechanism 40. The user may initiate an adjustment of the tightness adjusting mechanism 40 for the length of the strap assembly 20 through triggering the controlling switch. For example, when the user switches on the controlling switch to make the controlling switch be in a first controlling state, the tightness adjusting mechanism 40 is configured to perform an elongation adjusting process to increase the length of the strap assembly 20. When the user switches on the controlling switch to make the controlling switch be in a second controlling state, the tightness adjusting mechanism 40 is configured to perform a contraction adjusting process to decrease the length of the strap assembly 20.

At least the second force-bearing component 52, the first sensor, and the tightness adjusting mechanism 40 in the above-mentioned embodiments may be defined as a tightness adjusting device configured to adjust the whole length of the strap assembly 20.

In some embodiments, the controlling switch may be a power key of the head-mounted device 100. For example, when the user presses the power key to instruct to turn on the head-mounted device 100, the tightness adjusting mechanism 40 is configured to perform the elongation adjusting process to increase the length of the strap assembly 20. Of course, the controlling switch may also be a volume key of the head-mounted device 100. For example, a volume of the head-mounted device 100 may be adjusted by a short press for the volume key, and an adjustment of the length of the strap assembly 20 may be initiated through a long press for the volume key. The present disclosure may simplify a structure of the head-mounted device 100 by sharing a pressing key.

It is worth mentioning that, in some embodiments, the user may also perform a fine tune for the strap assembly 20, that is, the user may initiate a fine-tuning switch, after the head-mounted device is stably worn on the head, so as to satisfy requirements of the user for wearing comfort. For example, when the user wears the head-mounted device, a stepper motor in the driving assembly 44 is configured to rotate at a full step angle to shorten the second head strap 22. When the thickness of the cushion 522 is decreased and reaches the preset threshold of the thickness of the cushion 522, the stepper motor is configured to stop rotating. In this case, when the user turns on the fine-tuning switch again, or adjusts the controlling switch to be in a third state, the stepper motor may be configured to rotate at a half-step angle to shorten or lengthen the length of the strap assembly 20, so as to realize a fine tune, until the user turns off the fine-tuning switch. In this way, the length of the strap assembly 20 may not only make the head-mounted device stably worn on the head of the user, but also make the user feel comfortable, such that the head-mounted device may be suitable for users having different head shapes or different experience requirements.

In some embodiments of the present disclosure, a strap-adjusting device may be further provided, and the strap-adjusting device may be configured to adjust a length of a strap of the wearable device. Specifically, the strap-adjusting device may include a pressing piece, a first sensor, and a tightness adjusting mechanism. The pressing piece may be connected to the strap. The first sensor may be arranged on the pressing piece. The tightness adjusting mechanism may be cooperatively connected to the strap. Specifically, the pressing piece may include a supporting plate and a cushion, and the supporting plate may be connected directly to the strap. The strap may be the strap assembly in the above-mentioned embodiments, and structures of the first sensor and the tightness adjusting mechanism may be as described in the above-mentioned embodiments, which will not be repeated. It worth mentioning that, a connection between the supporting plate and the strap may be a direct connection or an indirect connection. For example, the supporting plate is directly glued to the strap, or two ends of the supporting plate are respectively connected to the strap, or, as described above, the supporting plate is fixed on the second housing assembly 30 and the strap is configured to be cooperatively connected to the tightness adjusting mechanism of the second housing assembly 30, so as to realize the indirect connection between the supporting plate and the strap.

As described in the above embodiments, the pressing piece may be the second force-bearing component 52 in the above embodiments. In some other embodiments, the pressing piece may also be the first force-bearing component 51; in this case, the supporting plate of the pressing piece is the supporting plate 511 of the first force-bearing component 51, and the cushion of the pressing piece is the cushion 514 of the first force-bearing component 51. In other embodiments, the pressing piece may be obtained by arranging the cushion on the first housing assembly 10; in this case, the first housing assembly 10 is equivalent to the supporting plate of the pressing piece. In another embodiment, the pressing piece may be obtained by arranging the cushion on the second housing assembly 30; in this case, the second housing assembly 30 is equivalent to the supporting plate of the pressing piece.

According to another aspect of the present disclosure, a strap-adjusting device is further provided and configured to adjust the length of the strap of the wearable device. Specifically, the strap-adjusting device may include a housing connected to the strap, a cushion arranged on the housing, a first sensor arranged on at least one of the housing or the cushion and configured to detect a deformation parameter value of the cushion, a tightness adjusting mechanism cooperatively connected to the strap and configured to adjust the length of the strap, and a processor configured to control the tightness adjusting mechanism to adjust the length of the strap in response to the deformation parameter value of the cushion detected by the first sensor.

Specifically, the strap may be the strap assembly 20 in the above-mentioned embodiments, and the housing may be the first housing assembly 10, the second housing assembly 30, or other housings connected to the strap assembly 20 in the above-mentioned embodiments. The structures of the cushion, the first sensor, and the tightness adjusting mechanism may be the same as those described in any of the above embodiments, which will not be repeated here.

The processor is configured to control the tightness adjusting mechanism to stop adjusting the length of the strap in response to the deformation parameter value of the cushion reaching a preset threshold.

In some embodiments, the strap has a first state in which the strap has the longest length and a second state in which the strap has the shortest length, the strap adjusting device may further include a second sensor connected to the processor and configured to detect whether a length of the strap is in the first state or the second state. The processor is configured to control the tightness adjusting mechanism to stop adjusting the length of the strap in response to the length of the strap being in the first state or the second state.

Figure 36:
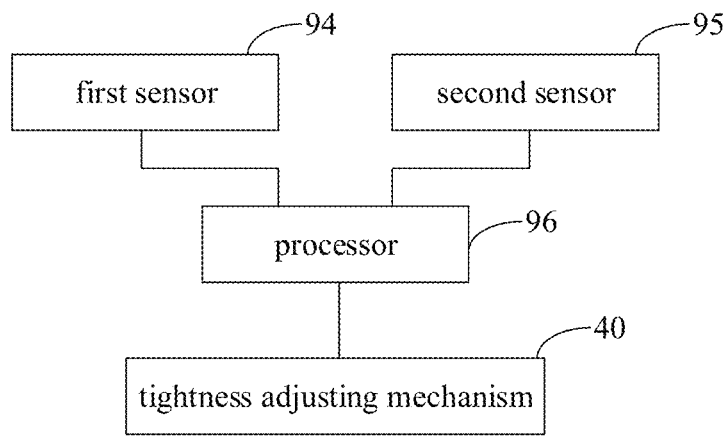
FIG. 36 is an adjusting principle block diagram of the tightness adjusting mechanism according to an embodiment of the present disclosure.

As shown in FIG. 36, the first sensor 94, the second sensor 95 and the tightness adjusting mechanism 40 are connected to the processor 96. The first sensor 94 is configured to send information of a detected deformation parameter value of the cushion to the processor 96. When the deformation parameter value of the cushion reaches the preset threshold, the processor 96 is configured to control the tightness adjusting mechanism 40 to stop adjusting the length of the strap assembly 20. The second sensor 95 is configured to send the detected state information of a length of the strap assembly 20 to the processor 96. When the length of the strap assembly 20 is in a state of being extending to the longest or in a state in which the strap has the shortest length, the processor 96 is configured to control the tightness adjusting mechanism 40 to stop adjusting the length of the strap assembly 20.

In some embodiments, the strap adjusting device may further include a controlling switch connected to the processor. The processor is configured to control the tightness adjusting mechanism to perform an elongation adjusting process to increase the length of the strap in response to the controlling switch being in a first controlling state. The processor is further configured to control the tightness adjusting mechanism to perform a contraction adjusting process to decrease or shorten the length of the strap in response to the controlling switch being in a second controlling state.

In some embodiments, as shown in FIG. 37, the processor 96 may include an MCU (Microprogrammed Control Unit) 961 and a logic circuit 962. A controlling switch 97 is connected to the MCU 961. The first sensor 94 may include a first sensing device 941 and a first magnet, and the second sensor 95 may include a second magnet, a second sensing device 952 and a third sensing device 953. The first sensing device 941, the second sensing device 952 and the third sensing device 953 are connected between the MCU 961 and the logic circuit 962. The driving assembly 44 in the tightness adjusting mechanism 40 are respectively connected to the MCU 961 and the logic circuit 962. In some embodiments, the first sensing device 941, the second sensing device 952 and the third sensing device 953 may all be Hall elements, and the first sensing device 941 is configured to determine a thickness of the cushion by detecting a magnetic field of the first magnet. The second magnet 951 and the second sensing device 952 are configured to determine a stretching state of the strap assembly 20 by detecting a magnetic field of the second magnet.

Taking the head-mounted device 100 of the above-mentioned embodiments as an example, an adjusting principle of the tightness adjusting mechanism of the present disclosure will be described in the following. When the head-mounted device 100 is not in use, the strap assembly 20 of the head-mounted device 100 is in the first state in which the strap has the longest length.

After the user wears the head-mounted device 100 on the head, the user first triggers the controlling switch 97 to make the controlling switch 97 be in the second controlling state. After receiving a signal corresponding to the second controlling state sent from the controlling switch 97, the processor 96 is configured to control the first sensing device 941 and the third sensing device 953 to start detecting, and simultaneously send an adjusting signal of rotating along a first direction to the driving assembly 44 (e.g. a motor of the driving assembly 44) of the tightness adjusting mechanism 40 to control the driving assembly 44 to be rotated along the first direction, such that the engaging gear 428 is driven by the transmission gear 430 to be rotated along the first direction, so as to drive the first head strap 21 and the second head strap 22 to move towards each other. In this way, the overlapping length between the first head strap 21 and the second head strap 22 may be increased to reduce the whole length of the strap assembly 20. At this time, the motor of the driving assembly 44 is configured to feed rotation information of the driving assembly 44 back to the MCU 961, the first sensing device 941 is configured to feed detection information of the first sensing device 941 back to the MCU 961, and the third sensing device 953 is configured to feed detection information of the third sensing device 953 back to the MCU 961.

As the whole length of the strap assembly 20 is gradually shortened, the cushion 522 is gradually pressed between the head of the user and the fixing plate 521. The cushion 522 is subjected a pressing force to be deformed, and the thickness of the cushion 522 is gradually reduced. When the thickness of the cushion 522 is reduced to the preset threshold of the thickness of the cushion 522, for example, reduced to 0.5 cm, then the logic circuit 962 is configured to send a controlling signal to control the motor of the driving assembly 44 to stop rotating, such that the engaging gear 428 may stop rotating, and the first head strap 21 and the second head strap 22 may stop moving; in this way, the compression or contraction of the strap assembly 20 may be stopped. The motor of the driving assembly 44 is simultaneously configured to feed information of stopping rotating back to the MCU.

It can be understood that, when the user does not wear the head-mounted device 100 on the head, but directly triggers the controlling switch 97 to make the controlling switch 97 be in the second controlling state, a control process of the processor 96 is similar to a control process mentioned above, and a difference is the following. Since the head-mounted device 100 is not worn on the head of the user, the cushion 522 is not pressed, therefore the thickness of the cushion 522 detected by the first sensing device 941 remains changed, until the whole length of the strap assembly 20 is gradually reduced to the shortest. At this moment, the third sensing device 953 detects that the strap assembly 20 is in the second state, then the logic circuit 962 is configured to send the controlling signal to control the motor of the driving assembly 44 to stop rotating, so as to make the engaging gear 428 stop rotating, and a possibility of a rotation jam of the first head strap 21 and the second head strap 22 may be reduced. At the same time, the motor of the driving assembly 44 is configured to feed information of stopping rotating back to the MCU.

When the user wants to take off the head-mounted device 100 from the head, the user first triggers the controlling switch 97 to make the controlling switch 97 be in the first controlling state. After receiving a signal corresponding to the first controlling state sent from the controlling switch 97, the processor 96 is configured to control the second sensing device 952 to start detecting, and simultaneously send the adjusting signal of rotating along a second direction to the driving assembly 44 (e.g. the motor of the driving assembly 44) of the tightness adjusting mechanism 40. The second direction is opposite to the first direction. As a result, the engaging gear 428 is driven by the transmission gear 430 to be rotated along the second direction, so as to drive the first head strap 21 and the second head strap 22 to move away from each other. In this way, the overlapping length between the first head strap 21 and the second head strap 22 may be reduced to increase the whole length of the strap assembly 20. Simultaneously, the motor of the driving assembly 44 is configured to feed rotation information of the driving assembly 44 back to the MCU 961, and the second sensing device 952 is configured to feed detection information of the second sensing device 952 back to the MCU 961.

As the whole length of the strap assembly 20 is gradually increased, when the whole length of the strap assembly 20 is increased to a certain length, the user may take off the head-mounted device 100 from the head of the user. The length of the strap assembly 20 continue to be increased until the strap assembly 20 is extended to the longest. In the case, the second sensing device 952 detects that the strap assembly 20 is in the first state, and then the logic circuit 962 is configured to send the controlling signal to control the motor of the driving assembly 44 to stop rotating, such that the engaging gear 428 stops rotating, and the first head strap 21 and the second head strap 22 are driven to stop moving away from each other. In this way, a possibility of the rotation jam of the first head strap 21 and the second head strap 22 may be reduced. The motor of the driving assembly 44 is simultaneously configured to feed information of being stopped to be rotated back to the MCU.

In conclusion, in some embodiments of the present disclosure, by detecting the thickness of the cushion through the first sensor, and adjusting the length of the strap through the tightness adjusting mechanism based on the thickness of the cushion detected by the first sensor, it is possible to realize an automatic adjustment for the strap. In this way, an adjustment of the length of the strap may be more comfortable, and the user experience may be better.

The above is preferred embodiments of the present disclosure, it should be pointed out that, for those of ordinary skill in the art, without departing from the principle of the present disclosure, may also make some improvements and modifications, which should be also considered within the protection scope of the present disclosure.

What is claimed is:

1. A strap adjusting device for adjusting a length of a strap of smart glasses, comprising:
   a pressing piece, comprising:
      a supporting plate, connected to the strap; and
      a cushion, arranged on the supporting plate, and configured to contact with a back of a head of a user;
   a first sensor, arranged on the pressing piece, and configured to detect a deformation parameter value of the cushion; and
   a tightness adjusting mechanism, cooperating with the strap, and configured to adjust the length of the strap in response to the deformation parameter value of the cushion;
   wherein a length-adjusting hole is defined at the strap, a sawtooth wave is arranged on a wall of the length-adjusting hole;
   wherein the tightness adjusting mechanism comprises:
      a ratchet;
      a pawl assembly, engaging with the ratchet, and comprising an engaging gear; wherein the engaging gear is arranged in the length-adjusting hole, and is engaged with the sawtooth wave;
      a transmission gear, engaged with the pawl assembly to drive the pawl assembly to rotate; and
      a driving assembly, engaged with the transmission gear;
   wherein in response to the deformation parameter value of the cushion, the driving assembly is configured to drive the pawl assembly to rotate by driving the transmission gear to rotate, and the engaging gear is driven to rotate, such that the strap is driven to move;
   wherein the pawl assembly further comprises:
      a mounting element, wherein the engaging gear is arranged on one side of the mounting element;
      a rotating plate, arranged on the other side of the mounting element, being rotatable, and cooperating with the transmission gear; and
      a pawl, pivotally connected to the mounting element, wherein one end of the pawl slidably abuts against a side surface of the rotating plate, and the other end of the pawl is engaged with the ratchet under an elastic force applied by an elastic member.

2. The strap adjusting device as claimed in claim 1, wherein the tightness adjusting mechanism is configured to stop adjusting the length of the strap, in response to the first sensor detecting the deformation parameter value of the cushion reaching a preset threshold.

3. The strap adjusting device as claimed in claim 1, wherein the deformation parameter value of the cushion comprises a thickness of the cushion.

4. The strap adjusting device as claimed in claim 3, wherein the first sensor comprises:
   a first sensing device, arranged on one of the supporting plate and the cushion; and
   a first magnet, arranged on another of the supporting plate and the cushion;
   wherein the first sensing device is configured to detect the thickness of the cushion by detecting a magnetic field generated by the first magnet.

5. The strap adjusting device as claimed in claim 4, wherein the first magnet is arranged on a surface of the cushion away from the supporting plate, and the first sensing device is arranged on a surface of the supporting plate close to the cushion.

6. The strap adjusting device as claimed in claim 2, wherein the strap has a first state in which the strap has a longest length and a second state in which the strap has a shortest length, and the strap adjusting device further comprises:
   a second sensor, connected to the tightness adjusting mechanism, and configured to detect a length of the strap;
   wherein the tightness adjusting mechanism is configured to stop adjusting the length of the strap, in response to the length of the strap being in the first state or the second state.

7. The strap adjusting device as claimed in claim 6, wherein the tightness adjusting mechanism comprises a housing, the housing is sleeved outside the strap, one end of the strap extends out the housing from one end of the housing, and another end of the strap extends out the housing from another end of the housing;
   wherein the second sensor comprises:
      a second magnet, fixed on the strap;

a second sensing device, arranged on the housing, and corresponding to the second magnet in response to the strap being in the first state; and
a third sensing device, arranged on the housing, and corresponding to the second magnet, in response to the strap being in the second state.

8. The strap adjusting device as claimed in claim 7, wherein in response to the strap being in the first state or the second state, the second magnet is located in the housing, and both the second sensing device and the third sensing device are arranged on an inner wall of the housing.

9. The strap adjusting device as claimed in claim 1, further comprising a controlling switch connected to the tightness adjusting mechanism;
wherein the tightness adjusting mechanism is configured to perform an elongation adjusting process to increase the length of the strap, in response to the controlling switch being in a first controlling state; and
wherein the tightness adjusting mechanism is configured to perform a contraction adjusting process to decrease the length of the strap, in response to the controlling switch being in a second controlling state.

10. Smart glasses, comprising:
a host housing;
a tightness adjusting mechanism, opposite to the host housing;
a strap assembly, connected to the host housing and the tightness adjusting mechanism to obtain an annular frame, the strap assembly comprising:
  a first head strap, connected to an end of the host housing and an end of the tightness adjusting mechanism; and
  a second head strap, connected to an opposite end of the host housing and an opposite end of the tightness adjusting mechanism;
a force-bearing component, comprising:
  a fixing plate, arranged on the annular frame; and
  a cushion, arranged on the fixing plate, and configured to contact with a back of a head of a user; and
a first sensor, arranged on the force-bearing component, and configured to detect a deformation parameter value of the cushion;
wherein the tightness adjusting mechanism is cooperatively connected to the first head strap and the second head strap and configured to adjust an overlapping length between the first head strap and the second head strap, in response to the deformation parameter value of the cushion;
wherein the tightness adjusting mechanism is configured to stop adjusting the overlapping length between the first head strap and the second head strap, in response to the first sensor detecting the deformation parameter value of the cushion reaching a preset threshold;
wherein a first end of the first head strap and a second end of the second head strap overlap with each other, a first length-adjusting hole is defined at the first end, a second length-adjusting hole is defined at the second end, a first sawtooth wave is arranged on a wall of the first length-adjusting hole, and a second sawtooth wave is arranged on a wall of the second length-adjusting hole;
wherein the tightness adjusting mechanism comprises:
  a housing for the tightness adjusting mechanism, comprising a continuous channel, wherein the first end and the second end are received in the continuous channel;
  a ratchet-pawl mechanism, accommodated in the housing for the tightness adjusting mechanism;
wherein the ratchet-pawl mechanism comprises:
  a ratchet;
  a pawl assembly, engaging with the ratchet, and comprising an engaging gear; wherein the engaging gear is arranged in both the first length-adjusting hole and the second length-adjusting hole, and is engaged with both the first sawtooth wave and the second sawtooth wave, the first sawtooth wave is located on one side of the engaging gear, and the second sawtooth wave is located on a side of the engaging gear opposite to the first sawtooth wave;
  a transmission gear, accommodated in the housing for the tightness adjusting mechanism, and engaged with the pawl assembly to drive the pawl assembly to rotate; and
  a driving assembly, accommodated in the housing for the tightness adjusting mechanism, and engaged with the transmission gear;
wherein in response to the deformation parameter value of the cushion, the driving assembly is configured to drive the pawl assembly to rotate by driving the transmission gear to rotate, and the engaging gear is driven to rotate, such that the first head strap and the second head strap are driven to move relative to each other;
wherein the pawl assembly further comprises:
  a mounting element, wherein the engaging gear is arranged on one side of the mounting element;
  a rotating plate, arranged on the other side of the mounting element, being rotatable, and cooperating with the transmission gear; and
  a pawl, pivotally connected to the mounting element, wherein one end of the pawl slidably abuts against a side surface of the rotating plate, and the other end of the pawl is engaged with the ratchet under an elastic force applied by an elastic member.

11. The smart glasses as claimed in claim 10, wherein the fixing plate is fixed on the housing for the tightness adjusting mechanism.

12. The smart glasses as claimed in claim 10, wherein the strap assembly has a first state in which the overlapping length between the first head strap and the second head strap is shortest and a second state in which the overlapping length between the first head strap and the second head strap is longest, and the smart glasses further comprise:
a second sensor, connected to the tightness adjusting mechanism, and configured to detect a length of the strap assembly;
wherein the tightness adjusting mechanism is configured to stop adjusting the overlapping length between the first head strap and the second head strap, in response to the length of the strap assembly being in the first state or the second state.

13. The as claimed in claim 10, further comprising a controlling switch connected to the tightness adjusting mechanism;
wherein the tightness adjusting mechanism is configured to perform an adjusting process to decrease the overlapping length between the first head strap and the second head strap, in response to the controlling switch being in a first controlling state; and
wherein the tightness adjusting mechanism is configured to perform an adjusting process to increase the overlapping length between the first head strap and the second head strap, in response to the controlling switch being in a second controlling state.

14. A strap adjusting device for adjusting a length of a strap of smart glasses, comprising:
- a housing, connected to the strap;
- a cushion, arranged on the housing, and configured to contact with a back of a head of a user;
- a first sensor, arranged on at least one of the housing or the cushion, and configured to detect a deformation parameter value of the cushion; and
- a tightness adjusting mechanism, cooperatively connected to the strap, and configured to adjust the length of the strap; and
- a processor, configured to control the tightness adjusting mechanism to adjust the length of the strap, in response to the deformation parameter value of the cushion detected by the first sensor;
- wherein a length-adjusting hole is defined at the strap, a sawtooth wave is arranged on a wall of the length-adjusting hole;
- wherein the tightness adjusting mechanism comprises:
  - a ratchet;
  - a pawl assembly, engaging with the ratchet, and comprising an engaging gear; wherein the engaging gear is arranged in the length-adjusting hole, and is engaged with the sawtooth wave;
  - a transmission gear, engaged with the pawl assembly to drive the pawl assembly to rotate; and
  - a driving assembly, engaged with the transmission gear;
- wherein in response to the deformation parameter value of the cushion, the driving assembly is configured to drive the pawl assembly to rotate by driving the transmission gear to rotate, and the engaging gear is driven to rotate, such that the strap is driven to move;
- wherein the pawl assembly further comprises:
  - a mounting element, wherein the engaging gear is arranged on one side of the mounting element;
  - a rotating plate, arranged on the other side of the mounting element, being rotatable, and cooperating with the transmission gear; and
  - a pawl, pivotally connected to the mounting element, wherein one end of the pawl slidably abuts against a side surface of the rotating plate, and the other end of the pawl is engaged with the ratchet under an elastic force applied by an elastic member.

15. The strap adjusting device as claimed in claim 14, wherein the processor is configured to control the tightness adjusting mechanism to stop adjusting the length of the strap, in response to the deformation parameter value of the cushion reaching a preset threshold.

16. The strap adjusting device as claimed in claim 15, wherein the strap has a first state in which the strap has a longest length and a second state in which the strap has a shortest length, and the strap adjusting device further comprises:
- a second sensor, connected to the processor, and configured to detect whether a length of the strap is in the first state or the second state;
- wherein the processor is configured to control the tightness adjusting mechanism to stop adjusting the length of the strap, in response to the length of the strap being in the first state or the second state.

17. The strap adjusting device as claimed in claim 14, further comprising a controlling switch connected to the processor;
- wherein the processor is configured to control the tightness adjusting mechanism to perform an elongation adjusting process to increase the length of the strap, in response to the controlling switch being in a first controlling state; and
- wherein the processor is configured to control the tightness adjusting mechanism to perform a contraction adjusting process to decrease the length of the strap, in response to the controlling switch being in a second controlling state.

* * * * *